United States Patent
Raghavan et al.

(10) Patent No.: US 12,520,167 B2
(45) Date of Patent: Jan. 6, 2026

(54) UE CAPABILITY INDICATION OF A MILLIMETER WAVE ANTENNA MODULE ENHANCED WITH A REFLECTOR

(71) Applicant: QUALCOMM Incorporated, San Diego, CA (US)

(72) Inventors: Vasanthan Raghavan, West Windsor Township, NJ (US); Raghu Narayan Challa, San Diego, CA (US); Mohammad Ali Tassoudji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 18/454,725

(22) Filed: Aug. 23, 2023

(65) Prior Publication Data
US 2025/0071569 A1  Feb. 27, 2025

(51) Int. Cl.
*H04W 16/28* (2009.01)
*H04B 7/0404* (2017.01)
*H04B 7/0417* (2017.01)
*H04B 7/06* (2006.01)

(52) U.S. Cl.
CPC .......... *H04W 16/28* (2013.01); *H04B 7/0404* (2013.01); *H04B 7/0417* (2013.01); *H04B 7/0628* (2013.01)

(58) Field of Classification Search
CPC ... H04W 16/28; H04B 7/0404; H04B 7/0417; H04B 7/0628; H04B 7/0695; H04B 7/088
USPC .......................................................... 455/517
See application file for complete search history.

(56) References Cited

U.S. PATENT DOCUMENTS

| | | | |
|---|---|---|---|
| 11,303,348 B1* | 4/2022 | Staple | G06N 3/045 |
| 2007/0135172 A1* | 6/2007 | Lysejko | H04W 16/28 455/562.1 |
| 2017/0264357 A1* | 9/2017 | Takahashi | H04B 7/0851 |
| 2021/0265742 A1* | 8/2021 | Lee | G01R 29/10 |

* cited by examiner

*Primary Examiner* — Don N Vo
(74) *Attorney, Agent, or Firm* — Procopio, Cory, Hargreaves & Savitch LLP/Qualcomm Incorporated

(57) ABSTRACT

UE capability indications of a millimeter wave antenna module enhanced with a reflector are described. An apparatus is configured to train or refine, with a network node, at least one beam for beamformed communications associated with the UE. The UE includes an antenna array with an associated non-radiating reflector of energy. The apparatus is configured to communicate, with the network node, using the antenna array and the at least one beam. Another apparatus is configured to train or refine, with a UE, at least one beam for beamformed communications associated with the UE based on a capability indication that indicates the UE includes an antenna array with an associated non-radiating reflector of energy. The apparatus is configured to communicate with the antenna array of the UE based on the at least one beam.

30 Claims, 14 Drawing Sheets

UE CAPABILITY INDICATION OF A MILLIMETER WAVE ANTENNA MODULE ENHANCED WITH A REFLECTOR

TECHNICAL FIELD

The present disclosure relates generally to communication systems, and more particularly, to wireless communications utilizing beamforming.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. That apparatus may be or may be included with a user equipment (UE), and may include at least one memory, an antenna array, a non-radiating reflector of energy associated with the antenna array, and at least one processor coupled to the at least one memory. The apparatus is configured to train or refine, with a network node, at least one beam for beamformed communications associated with the UE, where the UE includes an antenna array with an associated non-radiating reflector of energy. The apparatus is also configured to communicate, with the network node, using the antenna array and the at least one beam.

In the aspect, the method includes training or refining, with a network node, at least one beam for beamformed communications associated with the UE, where the UE includes an antenna array with an associated non-radiating reflector of energy. The method also includes communicating, with the network node, using the antenna array and the at least one beam.

In an aspect of the disclosure, a method, a computer-readable medium, and an apparatus are provided. The apparatus is configured to train or refine, with a UE, at least one beam for beamformed communications associated with the UE based on a capability indication that indicates the UE includes an antenna array with an associated non-radiating reflector of energy. The apparatus is also configured to communicate with the antenna array of the UE based on the at least one beam.

In the aspect, the method includes training or refining, with a UE, at least one beam for beamformed communications associated with the UE based on a capability indication that indicates the UE includes an antenna array with an associated non-radiating reflector of energy. The method also includes communicating with the antenna array of the UE based on the at least one beam.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
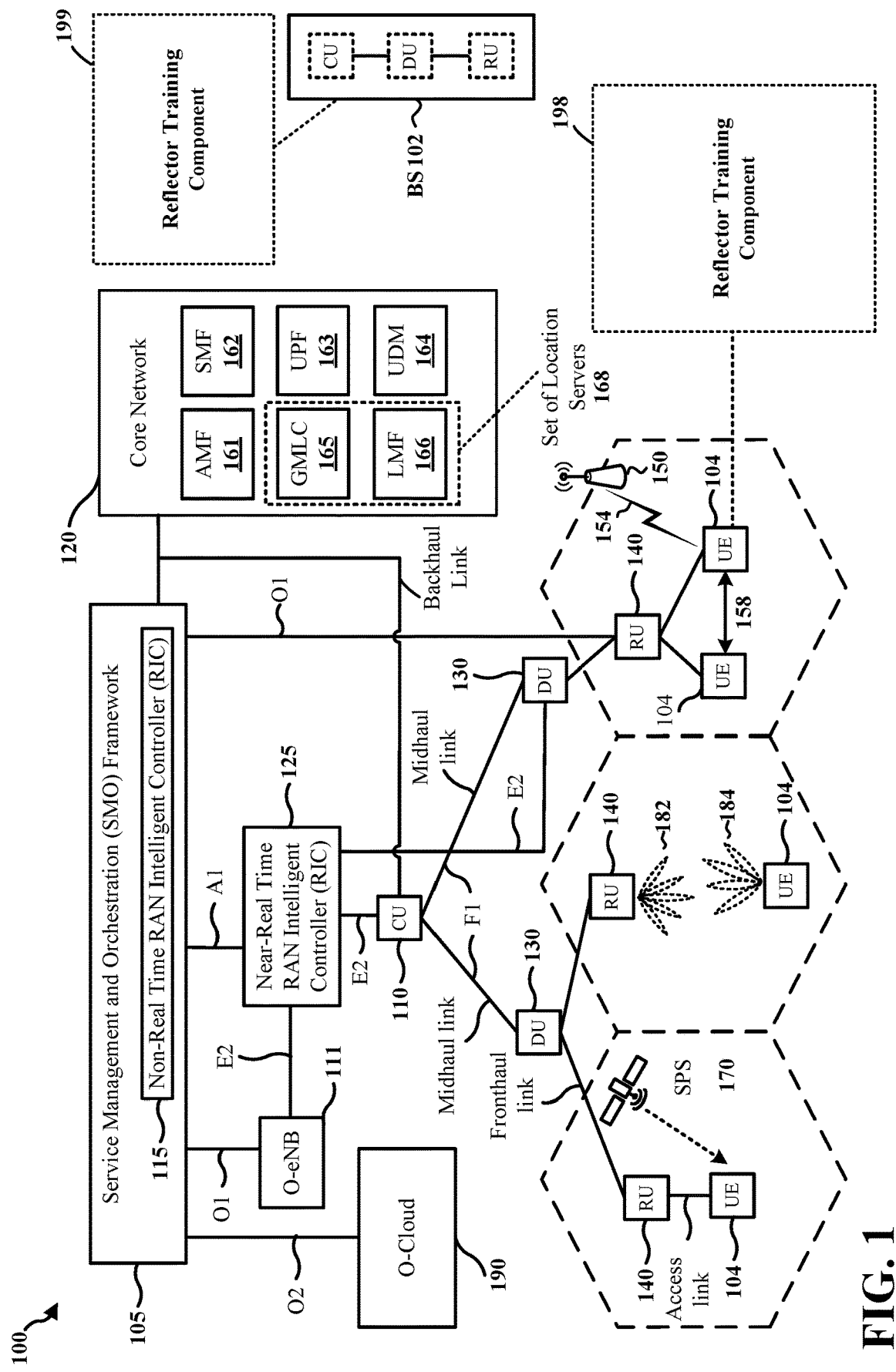
FIG. 1 is a diagram illustrating an example of a wireless communications system and an access network.

Wireless communication networks may transmit or receive signals with devices using various antenna configurations. As an example, a UE may support various antenna configurations to receive beamformed wireless communication. In some configurations, multiple antennas may be used at a network device (e.g., a base station, a gNB, etc.) and at a UE to exchange wireless communication in a millimeter wave system. Beamforming from multiple antennas may provide a bridge to the link budget in these systems. For instance, multiple antenna modules/panels (e.g., with each antenna module) having a set of antenna elements that can be co-phased in beamforming may be used in such systems. The use of multiple antenna modules may afford the ability to meet spherical coverage desired with and without hand/body blockage of devices, as well as robustness with beam switching over these antenna modules. Some UEs may support the use of two or three antenna modules on two or three edges thereof, where each antenna module may be made up of a 4×1 or a 5×1 dual-polarized antenna array. In some implementations, two antenna modules on the long edges of a UE may be used to reduce cost.

However, as millimeter wave systems evolve, some wireless devices may utilize a single antenna module solution to reduce cost. Thus, a single antenna module can be designed for which radio-frequency integrated circuit (RFIC) antenna feed constraints are managed in different ways. One such possibility is an L-shaped antenna module, the geometry of which may allow multiple bounces of radiation from the antenna elements via the hand/fingers of a user into different parts of the UE leading to better coverage over a sphere around the UE.

Various aspects relate generally to wireless communications utilizing beamforming. Some aspects more specifically relate to UE capability indications of a millimeter wave antenna module enhanced with a reflector. In some examples, a passive or non-radiating reflector enhancement has a geometry that allows multiple bounces of radiation from antenna elements via the hand/fingers of a user into different parts of the UE leading to better coverage over a sphere around the UE. In some examples, the passive reflectors may guide signals to different parts of the sphere and may be metal-based, glass-based, and/or the like. In some examples, a UE may indicate its capability of such an antenna module enhancement for reflecting energy so as to have the network node/entity assist the UE in beamforming aspects, where without such an indication, beam management overhead can be significant to learn the correct beam weights and gainfully utilize the passive reflection of energy.

Particular aspects of the subject matter described in this disclosure can be implemented to realize one or more of the following potential advantages. In some examples, by utilizing an antenna array with an associated non-radiating reflector of energy, the described techniques can be used to provide the ability to meet spherical coverage desired with and without hand/body blockage of devices. In some examples, by utilizing an antenna array with an associated non-radiating reflector of energy, the described techniques can be used to reduce cost and complexity of implementation for UEs over multi-sided antenna module. In some examples, by providing a capability of antenna module enhancement for reflecting energy, the described techniques can be used to train/refine beams for beamformed communications with a network node more efficiently with respect to beam management overhead, processing utilization, and power consumption.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2-1 (24.25 GHZ-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2-1, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2-1 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2-1 characteristics, and thus may effectively extend features of FR1 and/or FR2-1 into mid-band frequencies. In addition, higher frequency bands are currently being explored to extend 5G NR operation beyond 52.6 GHZ. For example, three higher operating bands have been identified as frequency range designations FR2-2 (52.6 GHz-71 GHZ), FR4 (71 GHZ-114.25 GHZ), and FR5 (114.25 GHZ-300 GHZ). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2-1. FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL- TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a reflector training component 198 ("component 198") that may be configured to train or refine, with a network node, at least one beam for beamformed communications (e.g., as described for 182 and 184) associated with the UE, where the UE includes an antenna array with an associated non-radiating reflector of energy. The component 198 may also be configured to communicate, with the network node, using the antenna array and the at least one beam. The component 198 may also be configured to transmit, to the network node, a capability indication that indicates the UE includes the antenna array with the associated non-radiating reflector of energy. The component 198 may also be configured to receive, from the network node, a subset of reference signals, where the subset of reference signals is based on the capability indication. In certain aspects, the base station 102 may have a reflector training component 199 ("component 199") that may be configured to train or refine, with a UE, at least one beam for beamformed communications associated with the UE based on a capability indication that indicates the UE includes an antenna array with an associated non-radiating reflector of energy. The component 199 may also be configured to communicate with the antenna array of the UE based on the at least one beam. The component 199 may be configured to receive, from the UE, the capability indication that indicates the UE includes the antenna array with the associated non-radiating reflector of energy. The component 199 may be configured to transmit, to the UE, a subset of reference signals, where the subset of reference signals is based on the capability indication. Accordingly, a UE may indicate its capability of an antenna module enhancement for reflecting energy so as to have network node/entity assist the UE in beamforming aspects, where minus such an indication, beam management overhead can be significant to learn the correct beam weights and gainfully utilize the passive reflector of energy.

Figure 2:
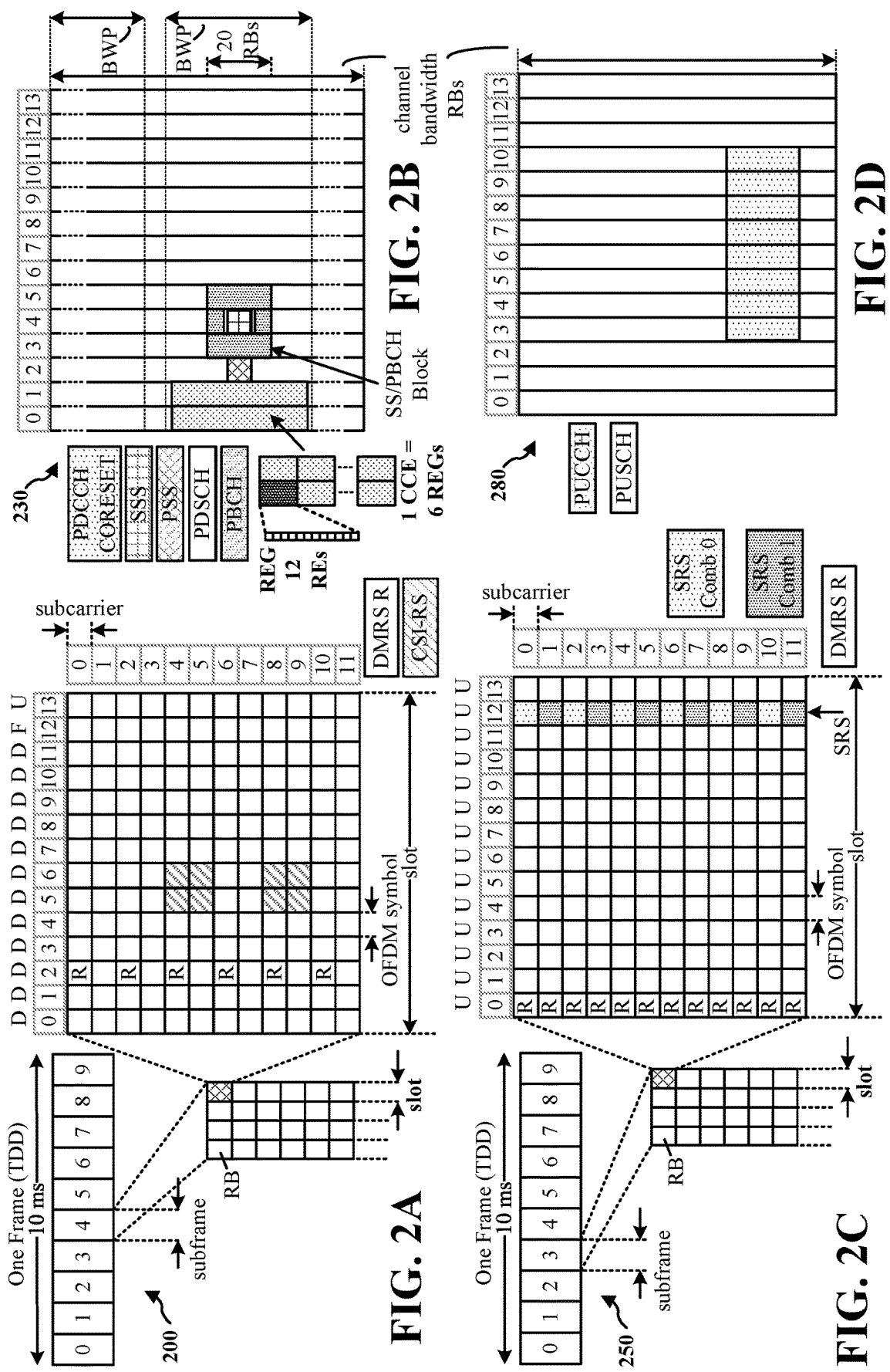
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
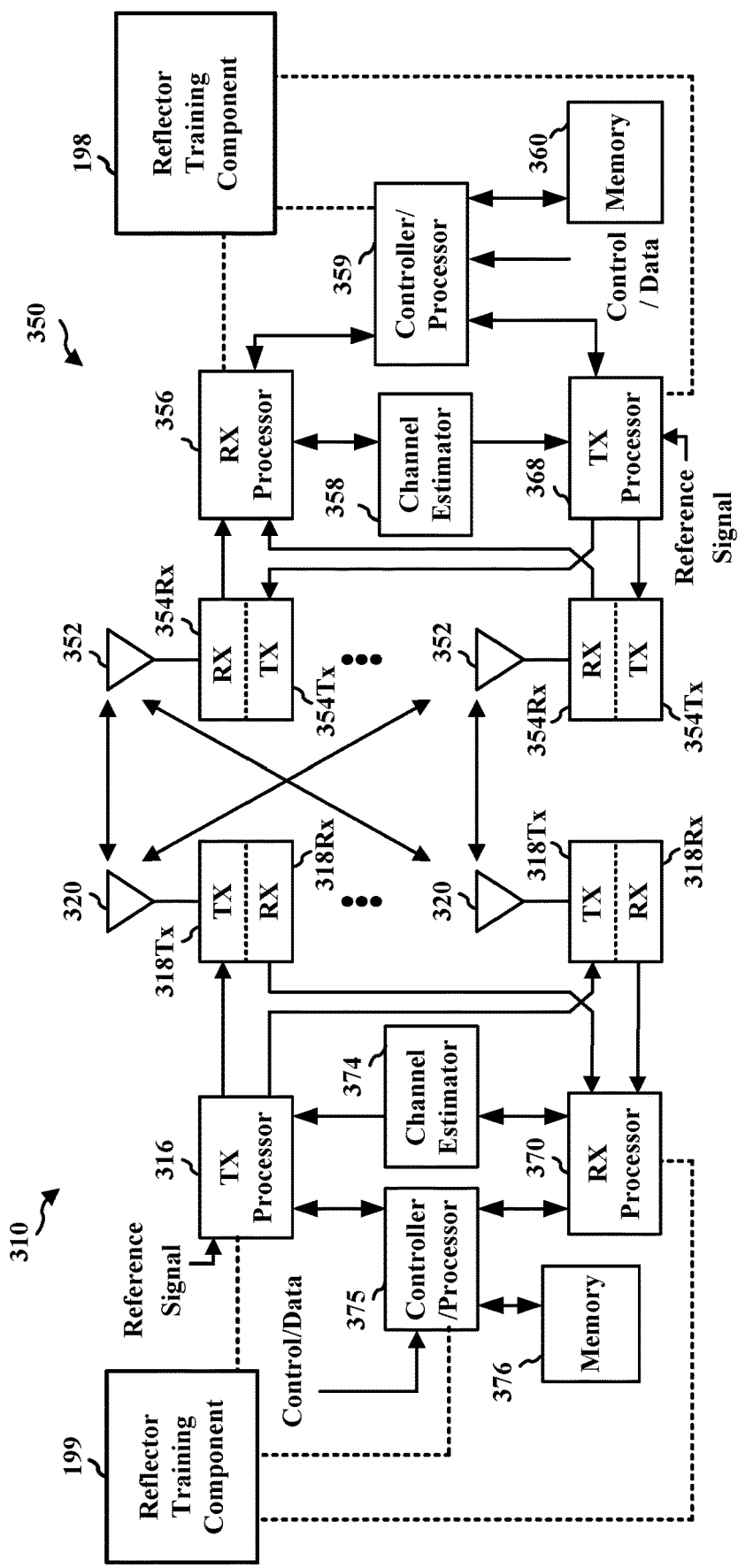
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1.

At least one of the TX processor 316, the RX processor 370, and the controller/processor 375 may be configured to perform aspects in connection with the component 199 of FIG. 1.

Wireless communication networks may support wireless communication using various antenna configurations, the communication being with UEs that also support various antenna configurations. In some configurations, multiple antennas may be used at a network device (e.g., a base station, a gNB, etc.) and at a UE, e.g., in millimeter wave communication systems. Beamforming from multiple antennas may provide a bridge to the link budget in these systems. For instance, multiple antenna modules/panels (e.g., with each antenna module) having a set of antenna elements that can be co-phased in beamforming may be used in such systems. The use of multiple antenna modules may afford the ability to meet spherical coverage desired with and without hand/body blockage of devices, as well as robustness with beam switching over these antenna modules. Some UEs may support the use of two or three antenna modules on two or three edges thereof, where each antenna module may be made up of a 4×1 or a 5×1 dual-polarized antenna array. In some implementations, two antenna modules on the long edges of a UE may be used to reduce cost. The multiple antennas at the UE and the network node may utilize beamforming to bridge the link budget in such wireless communication systems. Each antenna module at the UE may have a set of antenna elements that may be co-phased when beamforming is utilized, such as the beamformed signal 182 or 184 described in connection with FIG. 1. The use of multiple antenna modules may allow for the ability to meet a spherical coverage desired, e.g., spherical coverage requirements, with or without signal blockage due to hand, head, or any other body part of a user. The multiple antenna modules may also allow for robust beam switching over the multiple antenna modules. In some implementations, antenna modules may comprise dual polarized antenna elements, which may be utilized for transmissions in FR2-1 and frequencies beyond. An antenna module that includes a linear or planar array of antenna elements may be configured such that antenna elements on a horizontal polarization may be combined for one layer while antenna elements on a vertical polarization may be combined for a second layer. Beyond the horizontal/vertical polarizations, antenna elements may correspond to the slant 45 degrees/ slant-45 degrees polarization also.

However, as millimeter wave systems evolve, some wireless devices may utilize a single antenna module solution to reduce cost. Thus, a single antenna module can be designed for which the RFIC-induced antenna feed constraints are managed in different ways. One such possibility is an L-shaped antenna module, the geometry of which may allow multiple bounces of radiation from the antenna elements via the hand/fingers of a user into different parts of the UE leading to enhanced coverage over a sphere around the UE.

Figure 4:
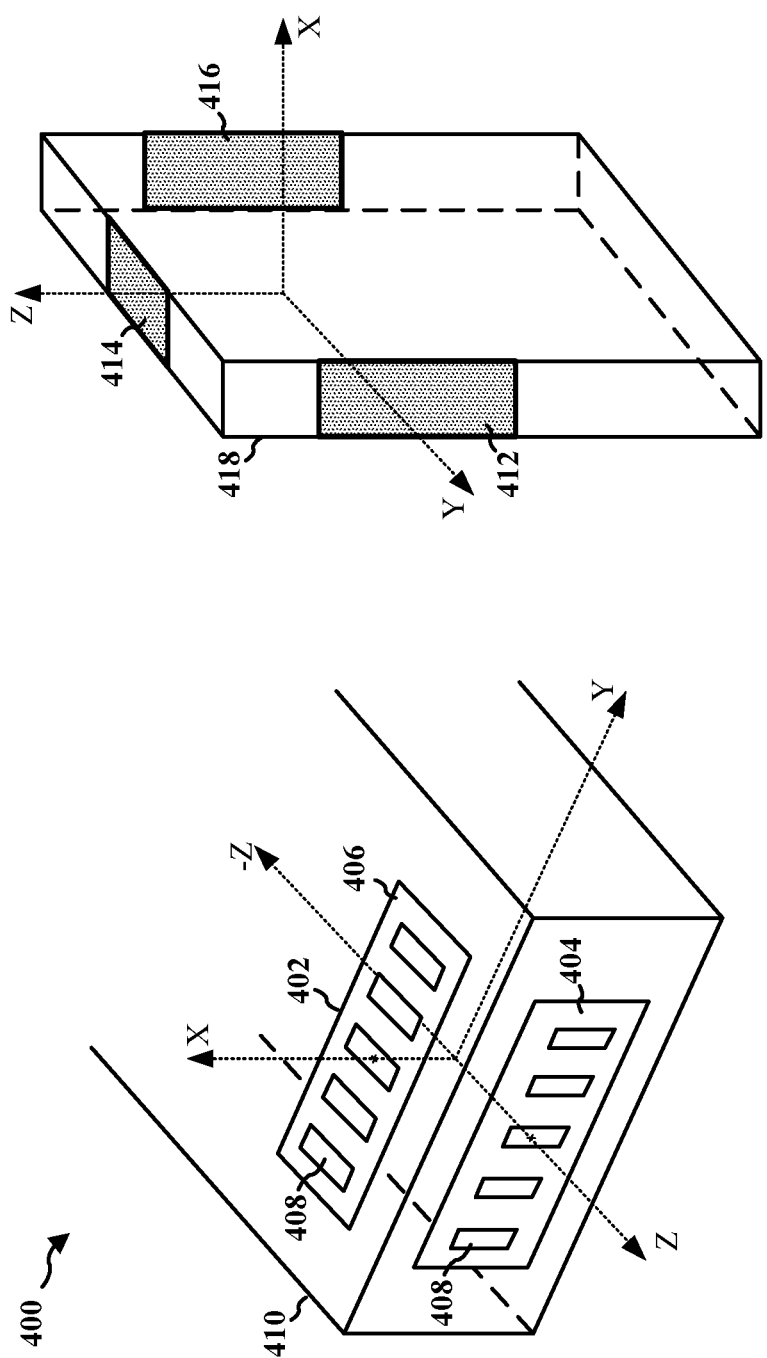
FIG. 4 is a diagram illustrating an example of a multi-sided antenna module.

FIG. 4 is a diagram 400 illustrating an example of a multi-sided antenna module. Diagram 400 shows an example L-shaped antenna module. In evolving implementations, from an antenna module perspective, a UE may include an antenna module mounted on some edges or faces, as shown for example in diagram 400. The diagram 400 illustrates a UE 410 having an antenna module 402 that includes a first side 404 and a second side 406, where a plurality of antenna elements 408 on each side of the antenna module (e.g., the first side 404 and the second side 406). The antenna elements 408 may be dual polarized antenna elements where the combination of the horizontal polarized antenna elements on the first side 404 are fixed with the horizontal polarized antenna elements on the second side 406, while the combination of the vertical polarized antenna elements on the first side 404 are fixed with the vertical polarized antenna elements on the second side 406. Such configuration may improve spherical coverage in some ways (e.g., along the x- and z-axes), however, such configuration may also lead to a sub-optimal performance in other ways.

Diagram 400 also illustrates a UE 418 having a first antenna module 412, a second antenna module 414, and a third antenna module 416, which may each include multiple antenna elements as described above for the UE 410. The UE 418 may perform beamforming from the first antenna module 412, the second antenna module 414, and the third antenna module 416 to bridge the link budget noted above. The multiple antenna modules/panels (e.g., the first antenna module 412 (y-axis), the second antenna module 414 (z-axis), and the third antenna module 416 (x-axis)) with respective sets of antenna elements may be co-phased in such beamforming are used in these systems and may afford the ability to meet spherical coverage with or without hand/body blockage, as well as robustness with beam switching over these modules. However, the cost and complexity of two or three (as shown) antenna modules for millimeter wave implementations is high.

Figure 5:
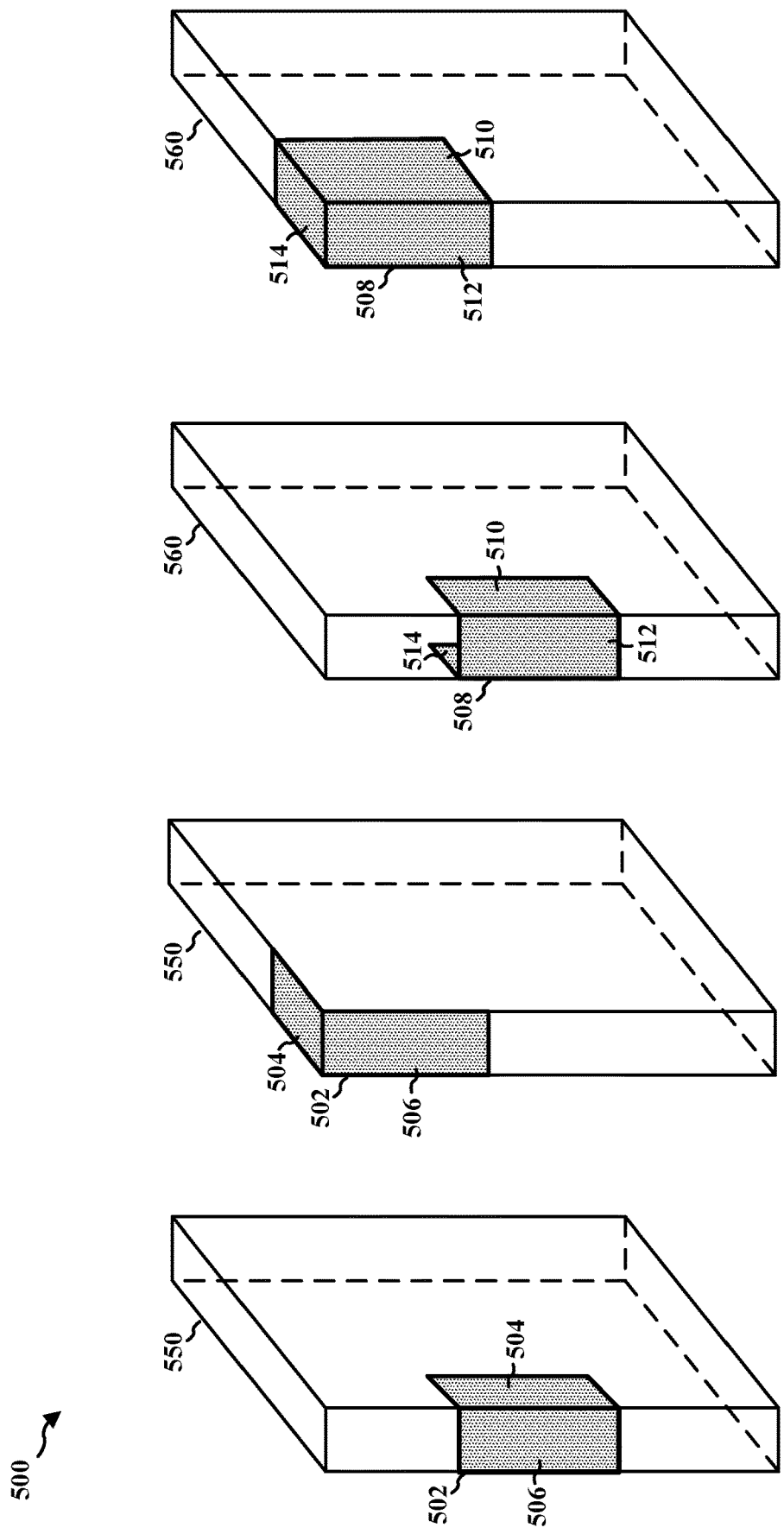
FIG. 5 is a diagram illustrating additional examples of multi-sided antenna modules.

FIG. 5 is a diagram 500 illustrating additional examples of multi-sided antenna modules. The diagram 500 shows a UE 550 in various configurations with multi-sided antenna modules, e.g., as described above for UE 410 in FIG. 4. In two configurations, the UE 550 includes an antenna module 502 that comprises two sides. The antenna module 502 comprises a first side 504 and a second side 506. For this example configuration in diagram 500, the antenna module 502 may be arranged to have an L-shaped configuration. The first side 504 and the second side 506 each may have a plurality of antenna elements (not shown, but as described herein), where the two sides may be at 90 degrees or substantially at 90 degrees with respect to each other. However, the antenna module 502 is not intended to be limited to having two sides or an L-shape configuration, and may have more than two sides or be configured to have different shapes. For example, with reference to a UE 560 in diagram 500, an antenna module 508 may comprise three sides: a first side 510, a second side 512, and a third side 514, in various arrangements.

The illustrated configurations for the UE 550 and the UE 560 may provide for dynamic polarization combinations of antenna elements in a manner that allows for reduced complexity over multiple, separate antenna modules. For example, in antenna modules having two or more sides, the antenna module may be configured to dynamically combine antenna elements on different sides of the antenna module to enhance performance, yet the enhanced performance still has a higher cost and complexity when compared to a single antenna module.

Aspects provide antennas utilizing reflectors (e.g., metallic-based, glass-based, etc.) that enhance the antenna spherical coverage and blockage scenarios. The aspects also provide for UE capability to support such an antenna with an enhancement. Various aspects herein for UE capability indications of a millimeter wave antenna module enhanced with a reflector provide for a passive or non-radiating reflector enhancement has a geometry that allows multiple bounces of radiation from antenna elements via the hand/fingers of a user into different parts of the UE that provides for spherical coverage improvements over the sphere. In aspects, the passive reflectors may guide signals to different parts of the sphere and may be metal-based, glass-based, and/or the like. The materials that could serve as reflectors could change depending on the carrier frequency of interest and based on the UE properties such as those corresponding to UE housing, etc. In aspects, a UE may indicate its capability of such an antenna module enhancement for reflecting energy so as to have network node/entity assist the UE in beamforming aspects, where without such an indication, beam management overhead can be significant to learn the correct beam weights and gainfully utilize the passive reflection of energy. The described aspects provide the ability to meet spherical coverage desired with and without hand/body blockage of devices by utilizing an antenna array with an associated non-radiating reflection of energy. The described aspects reduce cost and complexity of implementation for UEs over multi-sided antenna modules by utilizing an antenna array with an associated non-radiating reflection of energy. The described aspects can also be used to train/refine beams for beamformed communications with a network node more efficiently with respect to a beam management overhead, processing utilization, and power consumption by providing a capability of antenna module enhancement for reflecting energy.

Figure 6:
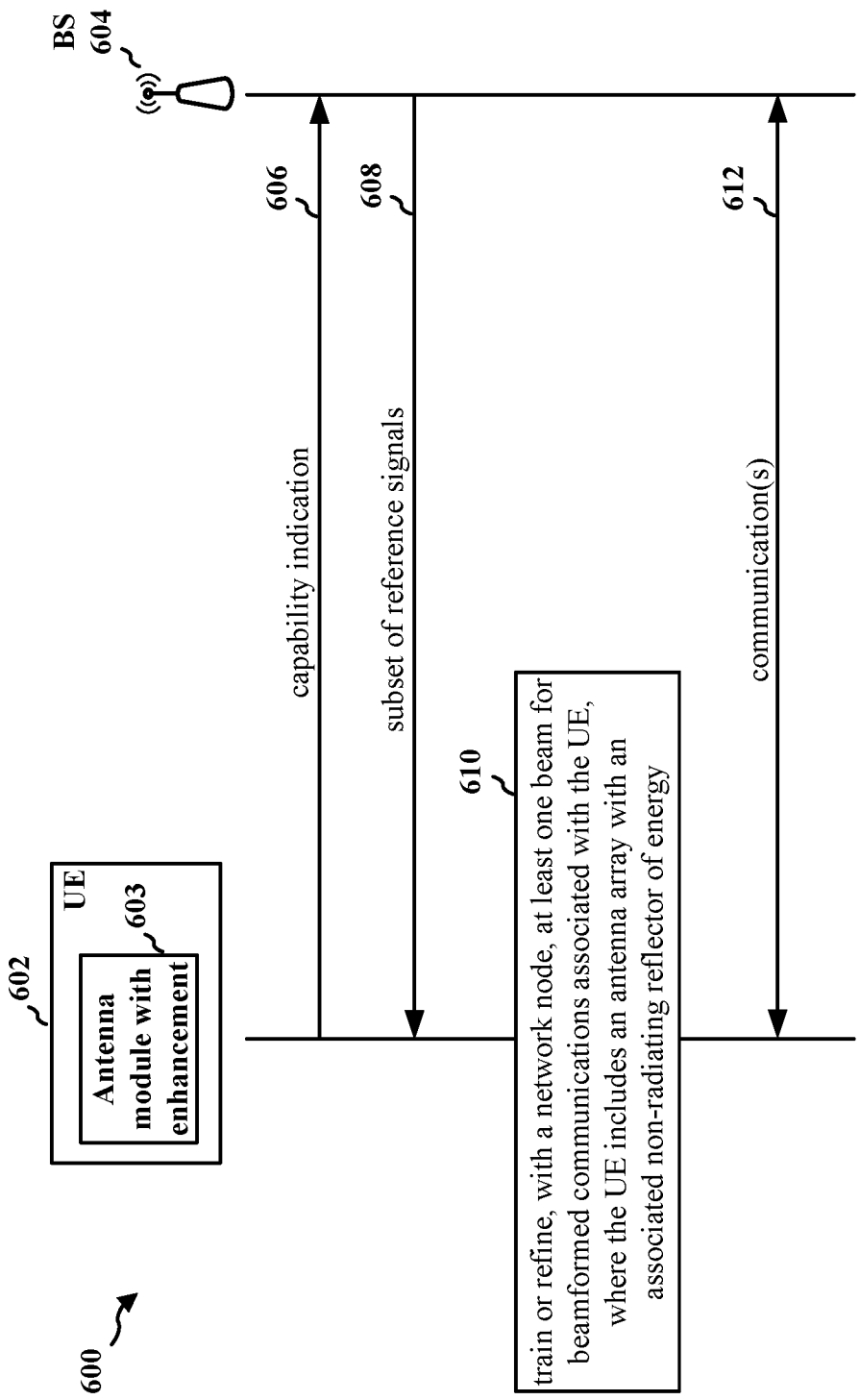
FIG. 6 is a call flow diagram for wireless communications, in accordance with various aspects of the present disclosure.

FIG. 6 is a call flow diagram 600 for wireless communications, in various aspects. Call flow diagram 600 illustrates UE capability indications of a millimeter wave antenna module enhanced with a reflector associated with a wireless device (a UE 602, by way of example) that may be configured to communicate with a network node (e.g., a base station 604, such as a gNB or other type of base station, by way of example, as shown) Aspects described for base stations may be performed by base station 604 in aggregated form and/or by one or more components of the base station in disaggregated form. Additionally, or alternatively, the aspects may be performed by the UE 602 autonomously, in addition to, and/or in lieu of, operations of the base station 604.

In the illustrated aspect, the UE 602 may be configured to transmit, to the base station 604 that may be configured to receive, a capability indication 606 that indicates the UE 602 includes an antenna array (e.g., a first antenna array) with an associated non-radiating reflector of energy (e.g., a first non-radiating reflector of energy) (e.g., collectively an antenna module with enhancement 603, as shown, or an enhanced antenna module). In such aspects, training or refining (e.g., at 610, described below), with a network node (e.g., the base station 604), at least one beam for beamformed communications associated with the UE 602 may be based on the capability indication 606. The capability indication 606 may indicate at least one of an effective isotropic radiated power (EIRP) or an effective isotropic sensitivity (EIS) depending on whether the transmit mode operation (e.g., EIRP) or receive mode operation (e.g., EIS) is of interest. In aspects, at least one of the EIRP or the EIS may be associated with a performance realized with an antenna array and its associated non-radiating reflector of energy (e.g., the antenna module with enhancement 603) of the UE 602. The EIRP and/or the EIS may be indicated as a value, a percentile value, a median, and/or the like, in aspects. The capability indication 606 may also indicate that the UE 602 includes at least one additional antenna array (e.g., a second antenna array) with an additional associated non-radiating reflector of energy (e.g., a second non-radiating reflector of energy) (e.g., which may also comprise the antenna module with enhancement 603 or a separate antenna module with enhancement). For example, the capability indication 606 may indicate a number of antenna arrays with associated non-radiating reflectors of energy (e.g., a number of the antenna module with enhancement 603) included at the UE 602. In some aspects, the capability indication 606 may indicate one or more frequency dependent spherical coverage gains associated with the antenna array and the associated non-radiating reflector of energy (e.g., the antenna module with enhancement 603).

The base station 604 may be configured to receive the capability indication 606 and to generate a subset of reference signals 608. For instance, the base station 604 may be configured to generate the subset of reference signals 608 from a set of reference signals that are configured/available for the UE 602. The base station 604 may be configured to determine, as the subset of reference signals 608, a number of reference signals, from a set of configured reference signals, that may be more/most effective for training/refining with the UE 602 based on the capability indication 606.

As an example, beam weights for gainfully utilizing the antenna module with enhancement 603 may be very different from beam weights needed for antenna module without enhancement, and thus, appropriate beam training for beams may be performed, as described herein. That is, beam training without the antenna module with enhancement 603 may be simplified for a given UE, where if N antenna elements form the linear/planar antenna array, K*N directional beams can be sounded out over SSBs where K≥1. On the other hand, for the antenna module with enhancement 603, beam weights may not be directional, e.g., because their impact may be distorted (constructively or destructively depending on the direction of interest) by the enhancement 603, and a general training of a beam(s) over the space of phase shifters and/or amplitude control may be utilized for performance. For example, considering an antenna module with N antenna elements, learning a covariance matrix R from which the general beam weights are learned may not be performed with fewer than $N^2$ reference signals. That is, without the capability indication 606, beam training for the antenna module with enhancement 603 may lead to significant reference signal, power, and/or thermal overheads, and/or the like, with respect to the UE 602 and the base station 604.

Accordingly, aspects herein provide for the base station 604 to determine the subset of reference signals 608, from the set of configured reference signals for the UE 602, based on information indicated by the capability indication 606 in order to reduce the burden for determination of beam weights by taking the configuration and capability of the UE 602 specifically into account. Thus, the base station 604 may be configured to transmit/provide, and the UE 602 may be configured to receive, the subset of reference signals 608.

The UE 602 (or similarly the base station 604) may be configured to train or refine (at 610), with the base station 604 (or similarly with the UE 602), at least one beam for beamformed communications 612 associated with the UE 602, where the UE 602 includes the antenna array with an associated non-radiating reflector of energy (e.g., the antenna module with enhancement 603). In aspects, the training or refining (at 610) for at least one beam may be performed with a set of beam weights used over the antenna array (e.g., the antenna module with enhancement 603) being defined over a space of phase shifters. In aspects, the training or refining (at 610) for at least one beam may be performed with a set of beam weights used over the antenna array (e.g., the antenna module with enhancement 603) being based on a use of amplitude control across the antenna elements of the antenna array. In aspects, the set of beam weights may be obtained (e.g., at 610) to be used over the antenna array based on the subset of reference signals 608, and the set of beam weights may be applied to at least one beam. In aspects, the training or refining (at 610) for at least one beam may be performed between the UE 602 and the base station 604 over a joint P2-P3 session using the subset of reference signals 608.

As an example, for beam management, a UE may use measurements of a reference signal (such as an SSB or CSI-RS) to perform multiple portions of beam management. A P1 procedure may be referred to as an initial beam acquisition/selection, P2 may be referred to as a beam refinement for the transmitter (e.g., base station), and P3 may be referred to as a beam refinement for a receiver (e.g., a UE)—all in the context of downlink transmissions. For P1, the base station may sweep transmissions over a set of beams, e.g., transmit a reference signal over a set of beams in a sweeping pattern. The UE performs measurements for the set of beams and reports one or more beams having the best measurements from the set of beams. The P1 beam sweep may be performed with wider beamwidth beams than P2 and P3, in some aspects. For the P2 procedure, the network transmits a signal on a set of narrower beamwidth beams over a narrower coverage range, e.g., which may be based on the information from the UE for the P1 procedure, and the UE reports one or more beams to the base station from the set of narrower beamwidth beams. For the P3 procedure, the base station may transmit using a fixed beam (e.g., rather than the beams swept in P1 and P2), e.g., transmitting repeatedly using the same beam. The beam for the P3 procedure may be based on the measurements of the beams in the P2 procedure. The UE can then perform measurements, of the reference signal transmitted from a single beam, in a beam sweep pattern (e.g., of multiple receive beams at the UE) to determine a receive beam, e.g., a spatial filter on a receive antenna array.

The UE 602 and the base station 604 may be configured to communicate (e.g., receive/transmit beamformed communication(s) 612), using the antenna array (e.g., the antenna module with enhancement 603) and the at least one beam that was trained/refined (at 610). Accordingly, the UE 602 may utilize a single linear array antenna module with an associated non-radiating reflector of energy (e.g., the antenna module with enhancement 603) and achieve performance commensurate with multiple array antenna modules using beams trained/refined (at 610) with a set of beam weights.

Figure 7:
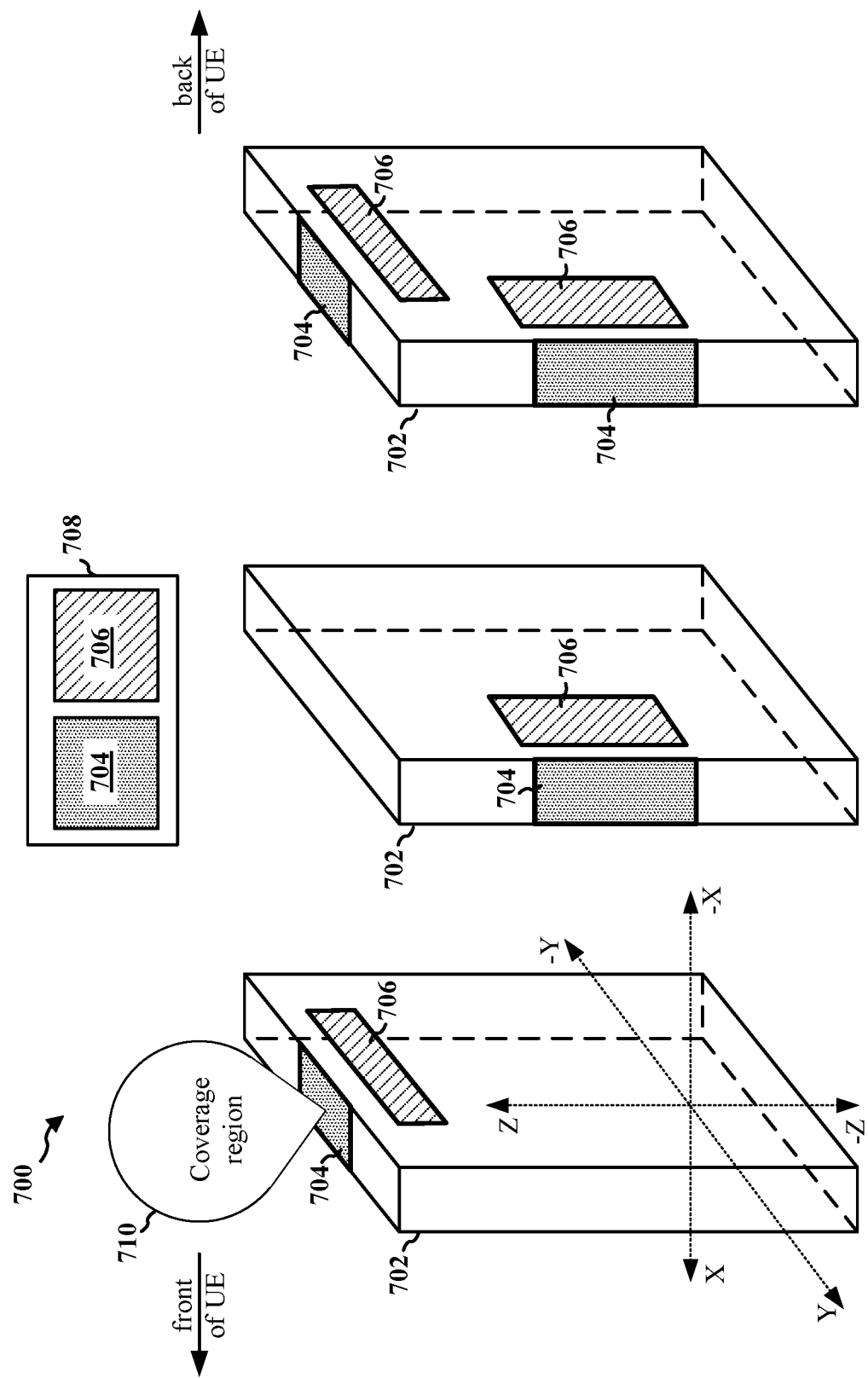
FIG. 7 is a diagram illustrating examples of an antenna array with an associated non-radiating reflector of energy, in accordance with various aspects of the present disclosure.

For instance, FIG. 7 is a diagram 700 illustrating examples of an antenna array with an associated non-radiating reflector of energy 708, in various aspects. The antenna array with an associated non-radiating reflector of energy 708 may be an aspect of the antenna module with enhancement 603 shown in FIG. 6, described above. Diagram 700 shows configurations of a UE 702 that includes the antenna array with an associated non-radiating reflector of energy 708 in different locations, orientations, numbers of instances, etc. An instance of the antenna array with an associated non-radiating reflector of energy 708, by way of example, may include a single linear array antenna module 704 and an associated non-radiating reflector of energy 706. In aspects, the antenna array with an associated non-radiating reflector of energy 708 (and/or the antenna module with enhancement 603 shown in FIG. 6) may be a portion of a transceiver, as described herein, or may be a separate hardware component communicatively coupled to at least one processor, at least one transceiver, and/or the like, of a wireless communication device (e.g., a UE). That is, a device may include a transceiver comprising an antenna module with enhancement, or a device may include a transceiver and a separate antenna module with enhancement, in aspects.

In freespace, energy may be seen along two axes of an L-shaped antenna module (e.g., boresight of the two sides, such as the x- and z-axes shown for the UE 410 in FIG. 4). The presence of a user's hand/fingers around a L-shaped antenna module reflects energy to different parts of the sphere around the UE, and the precise direction of energy reflection and gain distribution seen may depend on many factors associated with a user's hand/fingers such as the finger's dielectric properties, hand holding grip, gaps between fingers, etc. However, most reflection may be approximately distributed on the opposite corner of the sphere (−z axis). Additionally, L-shaped antenna modules may be too costly/complex to design for emerging millimeter wave implementations of UEs.

Aspects herein, however, provide similar performance using the single linear array antenna module 704 and the associated non-radiating reflector of energy 706 (e.g., the antenna array with an associated non-radiating reflector of energy 708) to serve as a second non-radiating, but reflecting, part of the antenna module. In basic/linear array antenna module designs, energy may be seen along a corresponding, facing axis in freespace. For example, the single linear array antenna module 704 at the top of the UE 702 in the left configuration may provide/receive energy in the direction of the z-axis, while the single linear array antenna module 704 at the side of the UE 702 in the center configuration may provide/receive energy in the direction of the y-axis. With a user's hand/fingers around or over a basic/original linear array antenna module, it may not radiate at all. However, in accordance with aspects herein and with respect to the left configuration of the UE 702, with the associated non-radiating reflector of energy 708, e.g., in the positions indicated and/or equivalent positions, even with a user's hand/fingers around or over the single linear array antenna module 704, the antenna array with an associated non-radiating reflector of energy 708 is able to radiate its energy outward by reflection to a coverage region 710 of a sphere (in the illustrated location by way of example along the z-axis, with additional reflections along other axes). Likewise, and with respect to the center configuration of the UE 702, with the associated non-radiating reflector of energy 708, e.g., in the positions indicated and/or equivalent positions, even with a user's hand/fingers around or over the single linear array antenna module 704, the antenna array with an associated non-radiating reflector of energy 708 is able to radiate its energy outward by reflection to a coverage region of a sphere (e.g., to the y-axis and/or other axes).

The UE 702 in the right configuration of diagram 700 illustrates multiple instances (e.g., two instances, by way of example) of the antenna array with an associated non-radiating reflector of energy 708 being included for the UE 702. It should be noted that the numbers shown for the antenna array with an associated non-radiating reflector of energy 708, the single linear array antenna module 704, the associated non-radiating reflector of energy 706, their respective locations, sizes, aspect ratios, proximity to each other, and/or the like, are illustrative and provided by way of example for description, and are not to be considered limiting. Further, the associated non-radiating reflector of energy 706 may be metallic-based, glass-based, and/or the like, according to aspects, in order to provide a passive, non-radiating surface for reflecting energy transmitted and/or received by the single linear array antenna module 704.

Antenna modules, e.g., the antenna array with an associated non-radiating reflector of energy 708, may be placed in the UE 702 where the field-of-view is not blocked and radiates away from the UE 702 housing. Redirection of energy may come from the signal bouncing off the hand/fingers of a user, and this reflected signal can be redirected again if it bounces off the body of the UE 702 such as those that include metallic or glass parts/components. As noted above, the associated non-radiating reflector of energy 706 may be metal-based, glass-based, and/or the like, and may be a film or sheet of reflective material specifically designed and placed for this reason. Covering the UE 702 housing with reflective layers may maximize the reflecting effect, however, covering the UE 702 impacts space for near field communications (NFC) and wireless charging coils, as well as interfering with these aspects of UE 702. Further, radiation may not traverse the UE 702 housing, as it is not hollow, may contain a battery (ies), a PCB(s), other materials, and/or the like.

Thus, in aspects, the UE 702 may be configured with one or more strategically placed instances of the associated non-radiating reflector of energy 706 that enhance the spherical coverage performance. Additionally, the associated non-radiating reflector of energy 706 may be less inexpensive to implement (e.g., in contrast to antenna modules) and thus can improve spherical coverage performance at minimal cost increase. When one or more of the single linear array antenna module 704 are blocked, the associated non-radiating reflector of energy 706 may be configured to take the bounced radiation from a given one or more of the single linear array antenna module 704 and enhance spherical coverage.

Figure 8:
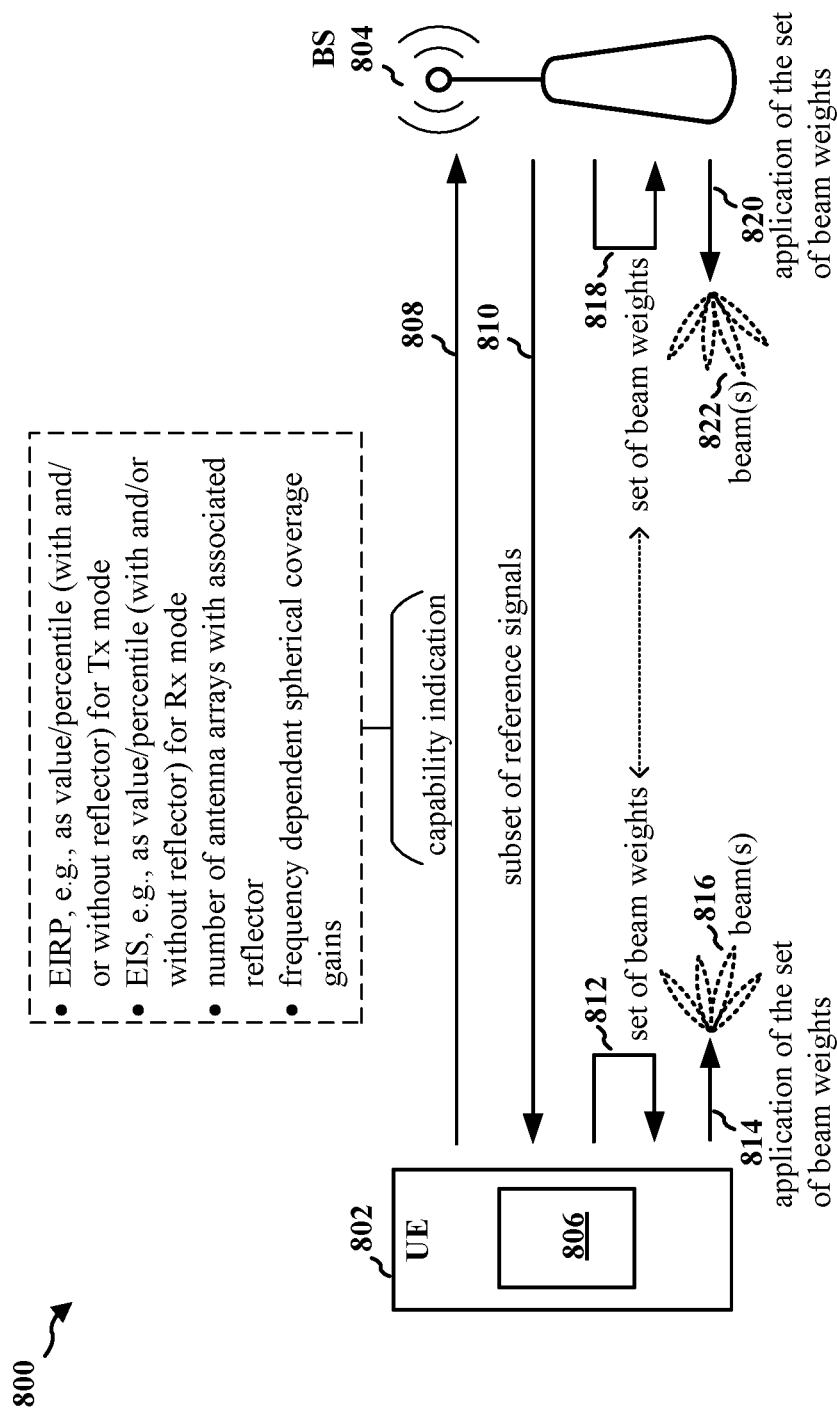
FIG. 8 is a diagram illustrating an example of training or refining a beam for beamformed communications based on a UE capability, in accordance with various aspects of the present disclosure.

FIG. 8 is a diagram 800 illustrating an example of training or refining a beam for beamformed communications based on a UE capability, in accordance with various aspects of the present disclosure. Diagram 800 is shown in the context of a UE 802, which includes an antenna array with an associated non-radiating reflector of energy 806, and a network node (e.g., a base station 804, a gNB, or portion thereof, and/or the like). Diagram 800 may be an aspect of diagram 600 in FIG. 6 and/or diagram 700 in FIG. 7.

The UE 802 may be configured to provide/transmit, and the base station 804 may be configured to receive, a capability indication 808, as described above. The capability indication 808 may indicate the UE 802 includes the antenna array with an associated non-radiating reflector of energy 806 (e.g., the antenna module with enhancement 603, as shown in FIG. 6; the antenna array with an associated non-radiating reflector of energy 708, as shown in FIG. 7). In such aspects, training or refining, with the base station 804, at least one beam for beamformed communications associated with the UE 802 may be based on the capability indication 808. The capability indication 808 may indicate at least one of an EIRP in a transmit mode or an EIS in a receive mode. In aspects, at least one of the EIRP or the EIS may be associated with a performance realized with an antenna array with or without its associated non-radiating reflector of energy (e.g., the antenna array with an associated non-radiating reflector of energy 806) of the UE 802. The EIRP and/or the EIS may be indicated as a value, a percentile value, a median, and/or the like, in aspects. The capability indication 808 may also indicate that the UE 802 includes at least one additional instance of the antenna array with an associated non-radiating reflector of energy 806. For example, the capability indication 808 may indicate a number of the antenna array with an associated non-radiating reflector of energy 806 included at the UE 802. In some aspects, the capability indication 808 may indicate one or more frequency dependent spherical coverage gains associated with the antenna array with an associated non-radiating reflector of energy 806.

The base station 804 may be configured to receive the capability indication 808 and to generate a subset of reference signals 810, as described for FIG. 6 above. For instance, the base station 804 may be configured to generate the subset of reference signals 810, from a set of reference signals that are configured/available for the UE 702, as a number of reference signals that may be more/most effective for training/refining with the UE 802 based on the capability indication 808. Thus, the base station 804 may be configured to transmit/provide, and the UE 802 may be configured to receive, the subset of reference signals 810.

The UE 602 may be configured to train or refine (e.g., as at 610, in FIG. 6), with the base station 804, at least one beam for beamformed communications (e.g., 612 in FIG. 6) associated with the UE 802. In aspects, the UE 802 includes the antenna array with an associated non-radiating reflector of energy 806 by which the a beam(s) are utilized for the beamformed communications. The training or refining for beam(s) may be performed with a set of beam weights 812 and/or a set of beam weights 818 used over the antenna array (e.g., of the antenna array with an associated non-radiating reflector of energy 806) being defined over a space of phase shifters. In aspects, the training or refining for a beam(s) may be performed with the set of beam weights 812 and/or the set of beam weights 818 used over the antenna array (e.g., of the antenna array with an associated non-radiating reflector of energy 806) being based on a use of amplitude control across the antenna elements.

In aspects, the set of beam weights 812 and/or the set of beam weights 818 may be obtained to be used over the antenna array with an associated non-radiating reflector of energy 806 based on the subset of reference signals 810, and the antenna array with an associated non-radiating reflector of energy 806 may be applied to at least one beam. For example, as illustrated, an application 814 of the set of beam weights 812 may be applied to a beam(s) 816 for the UE 802, and an application 820 of the set of beam weights 818 may be applied to a beam(s) 822 for the base station 804. In aspects, the set of beam weights 812 and/or the set of beam weights 818 may be shared between the UE 802 and the base station 804. Subsequently, communications between the UE 802 and the base station 804 may be performed, based on the beam(s) 816 and/or the beam(s) 822, utilizing the benefits of the antenna array with an associated non-radiating reflector of energy 806, as described herein.

Figure 9:
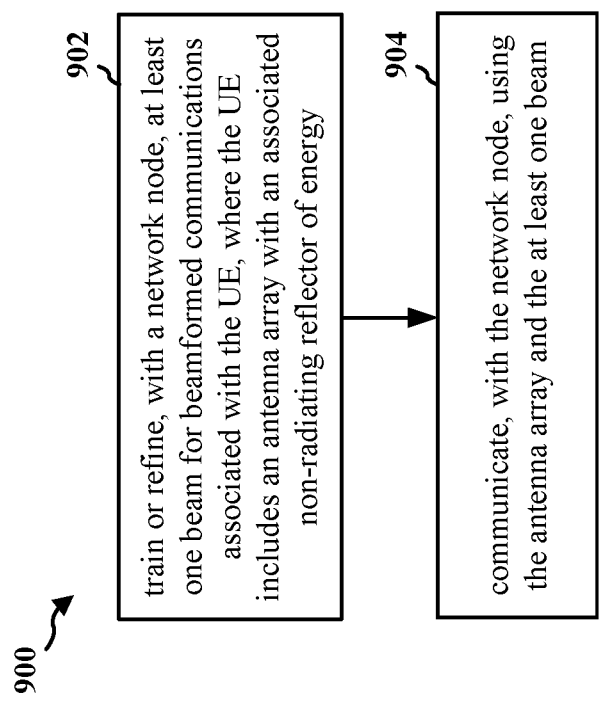
FIG. 9 is a flowchart of a method of wireless communication, in accordance with various aspects of the present disclosure.

FIG. 9 is a flowchart 900 of a method of wireless communication, in various aspects. The method may be performed by a UE (e.g., the UE 104, 602, 702, 802; the apparatus 1304). In some aspects, the method may include aspects described in connection with the communication flow in FIG. 6 and/or aspects described in FIGS. 7, 8. The method may be for UE capability indications of a millimeter wave antenna module enhanced with a reflector and may enable a UE may indicate its capability of an antenna module enhancement for reflecting energy so as to have network node/entity assist the UE in beamforming aspects, where minus such an indication, beam management overhead can be significant to learn the correct beam weights and gainfully utilize the passive reflector of energy.

At 902, the UE trains or refines, with a network node, at least one beam for beamformed communications associated with the UE, where the UE includes an antenna array with an associated non-radiating reflector of energy. As an example, the training or refinement may be performed by one or more of the component 198, the transceiver 1322, and/or the antenna 1380 in FIG. 13. FIGS. 6, 7, 8 illustrate an example of the UE 602 training or refining such a beam with a network node (e.g., the base station 604).

The UE 602 may be configured to transmit, to the base station 604 that may be configured to receive, a capability indication 606 (e.g., 808 in FIG. 8) that indicates the UE 602 includes an antenna array with an associated non-radiating reflector of energy (e.g., an antenna module with enhancement 603 (e.g., 704, 706, 708 in FIG. 7; 806 in FIG. 8), as shown). In such aspects, training or refining (e.g., at 610, described below), with a network node (e.g., the base station 604), at least one beam (e.g., 816, 822 in FIG. 8) for beamformed communications associated with the UE 602 may be based on the capability indication 606 (e.g., 808 in FIG. 8). The capability indication 606 (e.g., 808 in FIG. 8) may indicate at least one of an EIRP in a transmit mode or an EIS in a receive mode. In aspects, at least one of the EIRP or the EIS may be associated with a performance realized with an antenna array and its associated non-radiating reflector of energy (e.g., the antenna module with enhancement 603 (e.g., 704, 706, 708 in FIG. 7; 806 in FIG. 8)) of the UE 602. The EIRP and/or the EIS may be indicated as a value, a percentile value, a median, and/or the like, in aspects. The capability indication 606 (e.g., 808 in FIG. 8) may also indicate that the UE 602 includes at least one additional antenna array with an additional associated non-radiating reflector of energy (e.g., the antenna module with enhancement 603 (e.g., 704, 706, 708 in FIG. 7; 806 in FIG. 8)). For example, the capability indication 606 (e.g., 808 in FIG. 8) may indicate a number of antenna arrays with associated non-radiating reflectors of energy (e.g., a number of the antenna module with enhancement 603 (e.g., 704, 706, 708 in FIG. 7; 806 in FIG. 8)) included at the UE 602. In some aspects, the capability indication 606 (e.g., 808 in FIG. 8) may indicate one or more frequency dependent spherical coverage gains associated with the antenna array and the associated non-radiating reflector of energy (e.g., the antenna module with enhancement 603 (e.g., 704, 706, 708 in FIG. 7; 806 in FIG. 8)).

The base station 604 may be configured to receive the capability indication 606 (e.g., 808 in FIG. 8) and to generate a subset of reference signals 608 (e.g., 810 in FIG. 8). For instance, the base station 604 may be configured to generate the subset of reference signals 608 (e.g., 810 in FIG. 8) from a set of reference signals that are configured/available for the UE 602. The base station 604 may be configured to determine, as the subset of reference signals 608 (e.g., 810 in FIG. 8), a number of reference signals, from a set of configured reference signals, that may be more/most effective for training/refining with the UE 602 based on the capability indication 606 (e.g., 808 in FIG. 8).

As an example, beam weights (e.g., 812, 818 in FIG. 8) for gainfully utilizing the antenna module with enhancement 603 (e.g., 704, 706, 708 in FIG. 7; 806 in FIG. 8) may be very different from beam weights needed for antenna module without enhancement, and thus, appropriate beam training for beams (e.g., 816, 822 in FIG. 8) may be performed, as described herein. That is, beam training without the antenna module with enhancement 603 (e.g., 704, 706, 708 in FIG. 7; 806 in FIG. 8) may be simplified for a given UE, where if N antenna elements form the linear/planar antenna array, K*N directional beams can be sounded out over SSBs where K≥1. On the other hand, for the antenna module with enhancement 603 (e.g., 704, 706, 708 in FIG. 7; 806 in FIG. 8), beam weights (e.g., 812, 818 in FIG. 8) may not be directional, and general training of a beam(s) (e.g., 816, 822 in FIG. 8) over the space of phase shifters and/or amplitude control may be utilized for performance. For example, considering an antenna module with N antenna elements, learning a covariance matrix R from which the general beam weights are learned may not be performed with fewer than $N^2$ reference signals. That is, without the capability indication 606 (e.g., 808 in FIG. 8), beam training for the antenna module with enhancement 603 (e.g., 704, 706, 708 in FIG. 7; 806 in FIG. 8) may lead to significant reference signal, power, and/or thermal overheads, and/or the like, with respect to the UE 602 and the base station 604.

Accordingly, aspects herein provide for the base station 604 to determine the subset of reference signals 608 (e.g., 810 in FIG. 8), from the set of configured reference signals for the UE 602, based on information indicated by the capability indication 606 (e.g., 808 in FIG. 8) in order to reduce the burden for determination of beam weights (e.g., 812, 818 in FIG. 8) by taking the configuration and capability of the UE 602 specifically into account. Thus, the base station 604 may be configured to transmit/provide, and the UE 602 may be configured to receive, the subset of reference signals 608 (e.g., 810 in FIG. 8).

The UE 602 may be configured to train or refine (at 610), with the base station 604, at least one beam (e.g., 816, 822 in FIG. 8) for beamformed communications 612 associated with the UE 602, where the UE 602 includes the antenna array with an associated non-radiating reflector of energy (e.g., the antenna module with enhancement 603 (e.g., 704, 706, 708 in FIG. 7; 806 in FIG. 8)). In aspects, the training or refining (at 610) for at least one beam (e.g., 816, 822 in FIG. 8) may be performed with a set of beam weights (e.g., 812, 818 in FIG. 8) used over the antenna array (e.g., the antenna module with enhancement 603 (e.g., 704, 706, 708 in FIG. 7; 806 in FIG. 8)) being defined over a space of phase shifters. In aspects, the training or refining (at 610) for at least one beam (e.g., 816, 822 in FIG. 8) may be performed with a set of beam weights (e.g., 812, 818 in FIG. 8) used over the antenna array (e.g., the antenna module with enhancement 603 (e.g., 704, 706, 708 in FIG. 7; 806 in FIG. 8)) being based on a use of amplitude control across the antenna elements of the antenna array. In aspects, the set of beam weights (e.g., 812, 818 in FIG. 8) may be obtained (e.g., at 610) to be used over the antenna array based on the subset of reference signals 608 (e.g., 810 in FIG. 8), and the set of beam weights (e.g., 812, 818 in FIG. 8) may be applied (e.g., 814, 820 in FIG. 8) to at least one beam (e.g., 816, 822 in FIG. 8). In aspects, the training or refining (at 610) for at least one beam (e.g., 816, 822 in FIG. 8) may be performed between the UE 602 and the base station 604 over a joint P2-P3 session using the subset of reference signals 608 (e.g., 810 in FIG. 8).

At 904, the UE communicates, with the network node, using the antenna array and the at least one beam. As an example, the communication may be performed by one or more of the component 198, the transceiver 1322, and/or the antenna 1380 in FIG. 13. FIGS. 6, 7, 8 illustrate an example of the UE 602 communicating with a network node (e.g., the base station 604).

The UE 602 and the base station 604 may be configured to communicate (e.g., receive/transmit communication(s) 612), using the antenna array (e.g., the antenna module with enhancement 603 (e.g., 704, 706, 708 in FIG. 7; 806 in FIG. 8)) and the at least one beam (e.g., 816, 822 in FIG. 8) that was trained/refined (at 610). Accordingly, the UE 602 may utilize a single linear array antenna module with an associated non-radiating reflector of energy (e.g., the antenna module with enhancement 603 (e.g., 704, 706, 708 in FIG. 7; 806 in FIG. 8)) and achieve performance commensurate with multiple array antenna modules.

Figure 10:
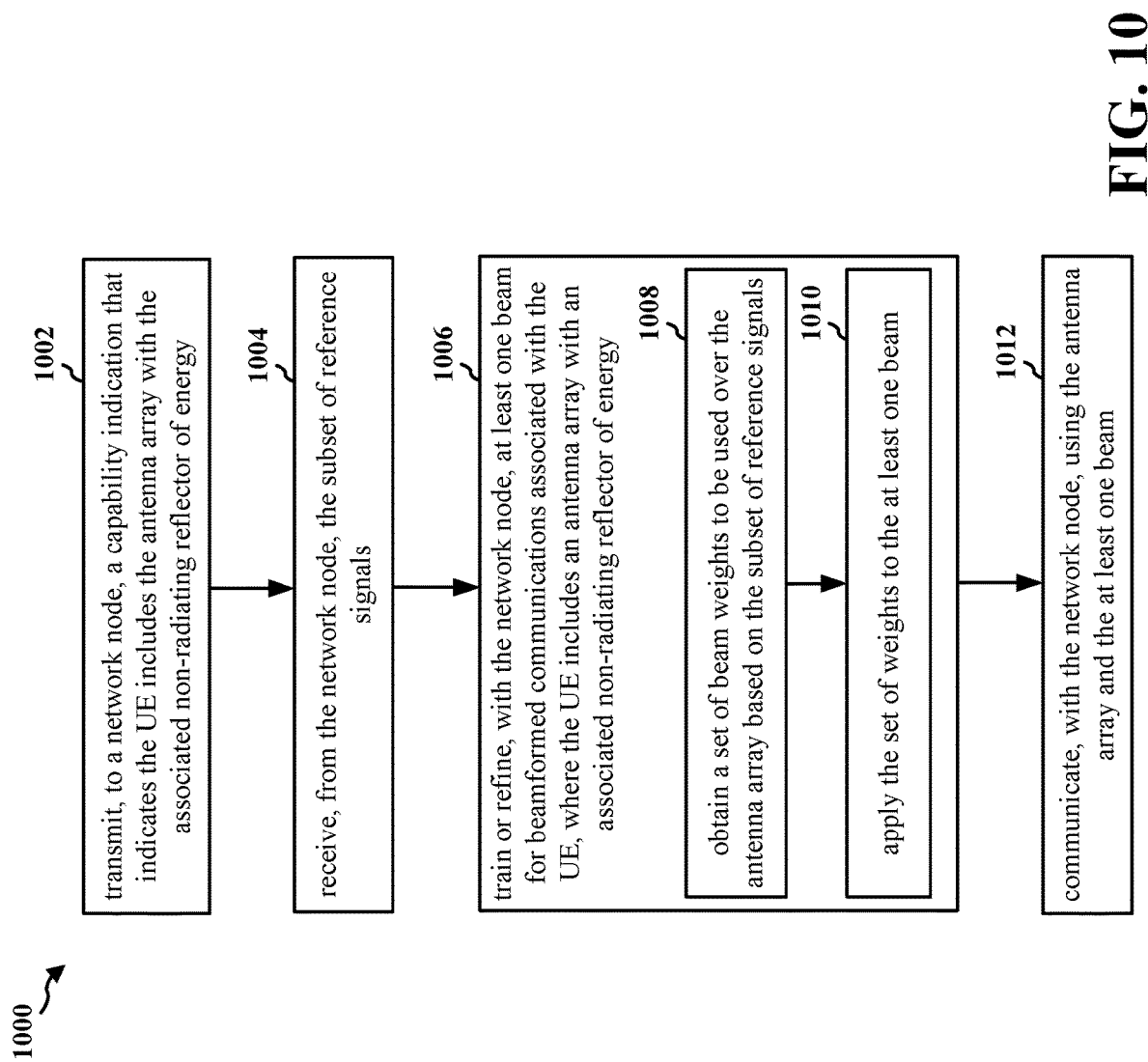
FIG. 10 is a flowchart of a method of wireless communication, in accordance with various aspects of the present disclosure.

FIG. 10 is a flowchart 1000 of a method of wireless communication, in various aspects. The method may be performed by a UE (e.g., the UE 104, 602, 702, 802; the apparatus 1304). In some aspects, the method may include aspects described in connection with the communication flow in FIG. 6 and/or aspects described in FIGS. 7, 8. The method may be for UE capability indications of a millimeter wave antenna module enhanced with a reflector and may enable a UE may indicate its capability of an antenna module enhancement for reflecting energy so as to have network node/entity assist the UE in beamforming aspects, where minus such an indication, beam management overhead can be significant to learn the correct beam weights and gainfully utilize the passive reflector of energy.

At 1002, the UE transmits, to a network node, a capability indication that indicates the UE includes the antenna array with the associated non-radiating reflector of energy. As an example, the transmission may be performed by one or more of the component 198, the transceiver 1322, and/or the antenna 1380 in FIG. 13. FIGS. 6, 7, 8 illustrate an example of the UE 602 transmitting such a capability indication to a network node (e.g., the base station 604).

The UE 602 may be configured to transmit, to the base station 604 that may be configured to receive, a capability indication 606 (e.g., 808 in FIG. 8) that indicates the UE 602 includes an antenna array with an associated non-radiating reflector of energy (e.g., an antenna module with enhancement 603 (e.g., 704, 706, 708 in FIG. 7; 806 in FIG. 8), as shown). In such aspects, training or refining (e.g., at 610, described below), with a network node (e.g., the base station 604), at least one beam (e.g., 816, 822 in FIG. 8) for beamformed communications associated with the UE 602 may be based on the capability indication 606 (e.g., 808 in FIG. 8). The capability indication 606 (e.g., 808 in FIG. 8) may indicate at least one of an EIRP in a transmit mode or an EIS in a receive mode. In aspects, at least one of the EIRP or the EIS may be associated with a performance realized with an antenna array and its associated non-radiating reflector of energy (e.g., the antenna module with enhancement 603 (e.g., 704, 706, 708 in FIG. 7; 806 in FIG. 8)) of the UE 602. The EIRP and/or the EIS may be indicated as a value, a percentile value, a median, and/or the like, in aspects. The capability indication 606 (e.g., 808 in FIG. 8) may also indicate that the UE 602 includes at least one additional antenna array with an additional associated non-radiating reflector of energy (e.g., the antenna module with enhancement 603 (e.g., 704, 706, 708 in FIG. 7; 806 in FIG. 8)). For example, the capability indication 606 (e.g., 808 in FIG. 8) may indicate a number of antenna arrays with associated non-radiating reflectors of energy (e.g., a number of the antenna module with enhancement 603 (e.g., 704, 706, 708 in FIG. 7; 806 in FIG. 8)) included at the UE 602. In some aspects, the capability indication 606 (e.g., 808 in FIG. 8) may indicate one or more frequency dependent spherical coverage gains associated with the antenna array and the associated non-radiating reflector of energy (e.g., the antenna module with enhancement 603 (e.g., 704, 706, 708 in FIG. 7; 806 in FIG. 8)).

At 1004, the UE receives, from the network node, the subset of reference signals. As an example, the reception may be performed by one or more of the component 198, the transceiver 1322, and/or the antenna 1380 in FIG. 13. FIGS. 6, 7, 8 illustrate an example of the UE 602 receiving such a subset of reference signals from a network node (e.g., the base station 604).

The base station 604 may be configured to transmit/provide, and the UE 602 may be configured to receive, the subset of reference signals 608 (e.g., 810 in FIG. 8). As noted above, the base station 604 may be configured to receive the capability indication 606 (e.g., 808 in FIG. 8) and to generate a subset of reference signals 608 (e.g., 810 in FIG. 8). For instance, the base station 604 may be configured to generate the subset of reference signals 608 (e.g., 810 in FIG. 8) from a set of reference signals that are configured/available for the UE 602. The base station 604 may be configured to determine, as the subset of reference signals 608 (e.g., 810 in FIG. 8), a number of reference signals, from a set of configured reference signals, that may be more/most effective for training/refining with the UE 602 based on the capability indication 606 (e.g., 808 in FIG. 8).

As an example, beam weights (e.g., 812, 818 in FIG. 8) for gainfully utilizing the antenna module with enhancement 603 (e.g., 704, 706, 708 in FIG. 7; 806 in FIG. 8) may be very different from beam weights needed for antenna module without enhancement, and thus, appropriate beam training for beams (e.g., 816, 822 in FIG. 8) may be performed, as described herein. That is, beam training without the antenna module with enhancement 603 (e.g., 704, 706, 708 in FIG. 7; 806 in FIG. 8) may be simplified for a given UE, where if N antenna elements form the linear/planar antenna array, K*N directional beams can be sounded out over SSBs where K≥1. On the other hand, for the antenna module with enhancement 603 (e.g., 704, 706, 708 in FIG. 7; 806 in FIG. 8), beam weights (e.g., 812, 818 in FIG. 8) may not be directional, and general training of a beam(s) (e.g., 816, 822 in FIG. 8) over the space of phase shifters and/or amplitude control may be utilized for performance. For example, considering an antenna module with N antenna elements, learning a covariance matrix R from which the general beam weights are learned may not be performed with fewer than N° reference signals. That is, without the capability indication 606 (e.g., 808 in FIG. 8), beam training for the antenna module with enhancement 603 (e.g., 704, 706, 708 in FIG. 7; 806 in FIG. 8) may lead to significant reference signal, power, and/or thermal overheads, and/or the like, with respect to the UE 602 and the base station 604.

Accordingly, aspects herein provide for the base station 604 to determine the subset of reference signals 608 (e.g., 810 in FIG. 8), from the set of configured reference signals for the UE 602, based on information indicated by the capability indication 606 (e.g., 808 in FIG. 8) in order to reduce the burden for determination of beam weights (e.g., 812, 818 in FIG. 8) by taking the configuration and capability of the UE 602 specifically into account.

At 1006, the UE trains or refines, with a network node, at least one beam for beamformed communications associated with the UE, where the UE includes an antenna array with an associated non-radiating reflector of energy. As an example, the training or refinement may be performed by one or more of the component 198, the transceiver 1322, and/or the antenna 1380 in FIG. 13. FIGS. 6, 7, 8 illustrate an example of the UE 602 training or refining such a beam with a network node (e.g., the base station 604).

The UE 602 may be configured to train or refine (at 610), with the base station 604, at least one beam (e.g., 816, 822 in FIG. 8) for beamformed communications 612 associated with the UE 602, where the UE 602 includes the antenna array with an associated non-radiating reflector of energy (e.g., the antenna module with enhancement 603 (e.g., 704, 706, 708 in FIG. 7; 806 in FIG. 8)). To train or refine with the base station 604, in 1006, the UE 602 may be configured to perform one or more additional operations, such in 1008 and/or 1010, described below.

At 1008, the UE obtains a set of beam weights to be used over the antenna array based on the subset of reference signals.

In aspects, the training or refining (at 610) for at least one beam (e.g., 816, 822 in FIG. 8) may be performed with a set of beam weights (e.g., 812, 818 in FIG. 8) used over the antenna array (e.g., the antenna module with enhancement 603 (e.g., 704, 706, 708 in FIG. 7; 806 in FIG. 8)) being defined over a space of phase shifters. In aspects, the training or refining (at 610) for at least one beam (e.g., 816, 822 in FIG. 8) may be performed with a set of beam weights (e.g., 812, 818 in FIG. 8) used over the antenna array (e.g., the antenna module with enhancement 603 (e.g., 704, 706, 708 in FIG. 7; 806 in FIG. 8)) being based on a use of amplitude control across the antenna elements of the antenna array. In aspects, the set of beam weights (e.g., 812, 818 in FIG. 8) may be obtained (e.g., at 610) to be used over the antenna array based on the subset of reference signals 608 (e.g., 810 in FIG. 8), and the set of beam weights (e.g., 812, 818 in FIG. 8) may be applied (e.g., 814, 820 in FIG. 8) to at least one beam (e.g., 816, 822 in FIG. 8). In aspects, the training or refining (at 610) for at least one beam (e.g., 816, 822 in FIG. 8) may be performed between the UE 602 and the base station 604 over a joint P2-P3 session using the subset of reference signals 608 (e.g., 810 in FIG. 8).

At 1010, the UE applies the set of beam weights to the at least one beam.

In aspects, the set of beam weights (e.g., 812, 818 in FIG. 8) may be obtained (e.g., at 610) to be used over the antenna array based on the subset of reference signals 608 (e.g., 810 in FIG. 8), and the set of beam weights (e.g., 812, 818 in FIG. 8) may be applied (e.g., 814, 820 in FIG. 8) to at least one beam (e.g., 816, 822 in FIG. 8). In aspects, the training or refining (at 610) for at least one beam (e.g., 816, 822 in FIG. 8) may be performed between the UE 602 and the base station 604 over a joint P2-P3 session using the subset of reference signals 608 (e.g., 810 in FIG. 8).

At 1012, the UE communicates, with the network node, using the antenna array and the at least one beam. As an example, the communication may be performed by one or more of the component 198, the transceiver 1322, and/or the antenna 1380 in FIG. 13. FIGS. 6, 7, 8 illustrate an example of the UE 602 communicating with a network node (e.g., the base station 604).

The UE 602 and the base station 604 may be configured to communicate (e.g., receive/transmit communication(s) 612), using the antenna array (e.g., the antenna module with enhancement 603 (e.g., 704, 706, 708 in FIG. 7; 806 in FIG. 8)) and the at least one beam (e.g., 816, 822 in FIG. 8) that was trained/refined (at 610). Accordingly, the UE 602 may utilize a single linear array antenna module with an associated non-radiating reflector of energy (e.g., the antenna module with enhancement 603 (e.g., 704, 706, 708 in FIG. 7; 806 in FIG. 8)) and achieve performance commensurate with multiple array antenna modules.

Figure 11:
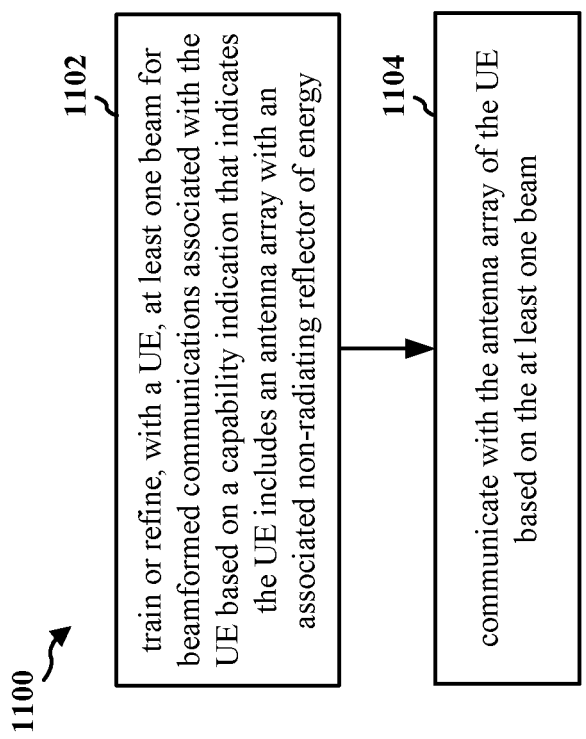
FIG. 11 is a flowchart of a method of wireless communication, in accordance with various aspects of the present disclosure.

FIG. 11 is a flowchart 1100 of a method of wireless communication, in various aspects. The method may be performed by a network node, such as a base station, gNB, etc. (e.g., the base station 102, 604, 804; the network entity 1302, 1402). In some aspects, the method may include aspects described in connection with the communication flow in FIG. 6 and/or aspects described in FIGS. 7, 8. The method may be for UE capability indications of a millimeter wave antenna module enhanced with a reflector and may enable a UE may indicate its capability of an antenna module enhancement for reflecting energy so as to have network node/entity assist the UE in beamforming aspects, where minus such an indication, beam management overhead can be significant to learn the correct beam weights and gainfully utilize the passive reflector of energy.

At 1102, the network node trains or refines, with a UE, at least one beam for beamformed communications associated with the UE based on a capability indication that indicates the UE includes an antenna array with an associated non-radiating reflector of energy. As an example, the training or refinement may be performed by one or more of the component 199, the transceiver 1446, and/or the antenna 1480 in FIG. 14. FIGS. 6, 7, 8 illustrate an example of a network node (e.g., the base station 604) training or refining such a beam with a UE (e.g., the UE 602).

The UE 602 may be configured to transmit, to the base station 604 that may be configured to receive, a capability indication 606 (e.g., 808 in FIG. 8) that indicates the UE 602 includes an antenna array with an associated non-radiating reflector of energy (e.g., an antenna module with enhancement 603 (e.g., 704, 706, 708 in FIG. 7; 806 in FIG. 8), as shown). In such aspects, training or refining (e.g., at 610, described below), with a network node (e.g., the base station 604), at least one beam (e.g., 816, 822 in FIG. 8) for beamformed communications associated with the UE 602 may be based on the capability indication 606 (e.g., 808 in FIG. 8). The capability indication 606 (e.g., 808 in FIG. 8) may indicate at least one of an EIRP in a transmit mode or an EIS in a receive mode. In aspects, at least one of the EIRP or the EIS may be associated with a performance realized with an antenna array and its associated non-radiating reflector of energy (e.g., the antenna module with enhancement 603 (e.g., 704, 706, 708 in FIG. 7; 806 in FIG. 8)) of the UE 602. The EIRP and/or the EIS may be indicated as a value, a percentile value, a median, and/or the like, in aspects. The capability indication 606 (e.g., 808 in FIG. 8) may also indicate that the UE 602 includes at least one additional antenna array with an additional associated non-radiating reflector of energy (e.g., the antenna module with enhancement 603 (e.g., 704, 706, 708 in FIG. 7; 806 in FIG. 8)). For example, the capability indication 606 (e.g., 808 in FIG. 8) may indicate a number of antenna arrays with associated non-radiating reflectors of energy (e.g., a number of the antenna module with enhancement 603 (e.g., 704, 706, 708 in FIG. 7; 806 in FIG. 8)) included at the UE 602. In some aspects, the capability indication 606 (e.g., 808 in FIG. 8) may indicate one or more frequency dependent spherical coverage gains associated with the antenna array and the associated non-radiating reflector of energy (e.g., the antenna module with enhancement 603 (e.g., 704, 706, 708 in FIG. 7; 806 in FIG. 8)).

The base station 604 may be configured to receive the capability indication 606 (e.g., 808 in FIG. 8) and to generate a subset of reference signals 608 (e.g., 810 in FIG. 8). For instance, the base station 604 may be configured to generate the subset of reference signals 608 (e.g., 810 in FIG. 8) from a set of reference signals that are configured/available for the UE 602. The base station 604 may be configured to determine, as the subset of reference signals 608 (e.g., 810 in FIG. 8), a number of reference signals, from a set of configured reference signals, that may be more/most effective for training/refining with the UE 602 based on the capability indication 606 (e.g., 808 in FIG. 8).

As an example, beam weights (e.g., 812, 818 in FIG. 8) for gainfully utilizing the antenna module with enhancement 603 (e.g., 704, 706, 708 in FIG. 7; 806 in FIG. 8) may be very different from beam weights needed for antenna module without enhancement, and thus, appropriate beam training for beams (e.g., 816, 822 in FIG. 8) may be performed, as described herein. That is, beam training without the antenna module with enhancement 603 (e.g., 704, 706, 708 in FIG. 7; 806 in FIG. 8) may be simplified for a given UE, where if N antenna elements form the linear/planar antenna array, K*N directional beams can be sounded out over SSBs where K≥1. On the other hand, for the antenna module with enhancement 603 (e.g., 704, 706, 708 in FIG. 7; 806 in FIG. 8), beam weights (e.g., 812, 818 in FIG. 8) may not be directional, and general training of a beam(s) (e.g., 816, 822 in FIG. 8) over the space of phase shifters and/or amplitude control may be utilized for performance. For example, considering an antenna module with N antenna elements, learning a covariance matrix R from which the general beam weights are learned may not be performed with fewer than $N^2$ reference signals. That is, without the capability indication 606 (e.g., 808 in FIG. 8), beam training for the antenna module with enhancement 603 (e.g., 704, 706, 708 in FIG. 7; 806 in FIG. 8) may lead to significant reference signal, power, and/or thermal overheads, and/or the like, with respect to the UE 602 and the base station 604.

Accordingly, aspects herein provide for the base station 604 to determine the subset of reference signals 608 (e.g., 810 in FIG. 8), from the set of configured reference signals for the UE 602, based on information indicated by the capability indication 606 (e.g., 808 in FIG. 8) in order to reduce the burden for determination of beam weights (e.g., 812, 818 in FIG. 8) by taking the configuration and capability of the UE 602 specifically into account. Thus, the base station 604 may be configured to transmit/provide, and the UE 602 may be configured to receive, the subset of reference signals 608 (e.g., 810 in FIG. 8).

The base station 604 may be configured to train or refine (at 610), with the UE 602, at least one beam (e.g., 816, 822 in FIG. 8) for beamformed communications 612 associated with the UE 602, where the UE 602 includes the antenna array with an associated non-radiating reflector of energy (e.g., the antenna module with enhancement 603 (e.g., 704, 706, 708 in FIG. 7; 806 in FIG. 8)). In aspects, the training or refining (at 610) for at least one beam (e.g., 816, 822 in FIG. 8) may be performed with a set of beam weights (e.g., 812, 818 in FIG. 8) used over the antenna array (e.g., the antenna module with enhancement 603 (e.g., 704, 706, 708 in FIG. 7; 806 in FIG. 8)) being defined over a space of phase shifters. In aspects, the training or refining (at 610) for at least one beam (e.g., 816, 822 in FIG. 8) may be performed with a set of beam weights (e.g., 812, 818 in FIG. 8) used over the antenna array (e.g., the antenna module with enhancement 603 (e.g., 704, 706, 708 in FIG. 7; 806 in FIG. 8)) being based on a use of amplitude control across the antenna elements of the antenna array. In aspects, the set of beam weights (e.g., 812, 818 in FIG. 8) may be obtained (e.g., at 610) to be used over the antenna array based on the subset of reference signals 608 (e.g., 810 in FIG. 8), and the set of beam weights (e.g., 812, 818 in FIG. 8) may be applied (e.g., 814, 820 in FIG. 8) to at least one beam (e.g., 816, 822 in FIG. 8). In aspects, the training or refining (at 610) for at least one beam (e.g., 816, 822 in FIG. 8) may be performed between the UE 602 and the base station 604 over a joint P2-P3 session using the subset of reference signals 608 (e.g., 810 in FIG. 8).

At 1104, the network node communicates with the antenna array of the UE based on the at least one beam. As an example, the communication may be performed by one or more of the component 199, the transceiver 1446, and/or the antenna 1480 in FIG. 14. FIGS. 6, 7, 8 illustrate an example of a network node (e.g., the base station 604) communicating with a UE (e.g., the UE 602).

The UE 602 and the base station 604 may be configured to communicate (e.g., receive/transmit communication(s) 612), using the antenna array (e.g., the antenna module with enhancement 603 (e.g., 704, 706, 708 in FIG. 7; 806 in FIG. 8)) and the at least one beam (e.g., 816, 822 in FIG. 8) that was trained/refined (at 610). Accordingly, the UE 602 may utilize a single linear array antenna module with an associated non-radiating reflector of energy (e.g., the antenna module with enhancement 603 (e.g., 704, 706, 708 in FIG. 7; 806 in FIG. 8)) and achieve performance commensurate with multiple array antenna modules.

Figure 12:
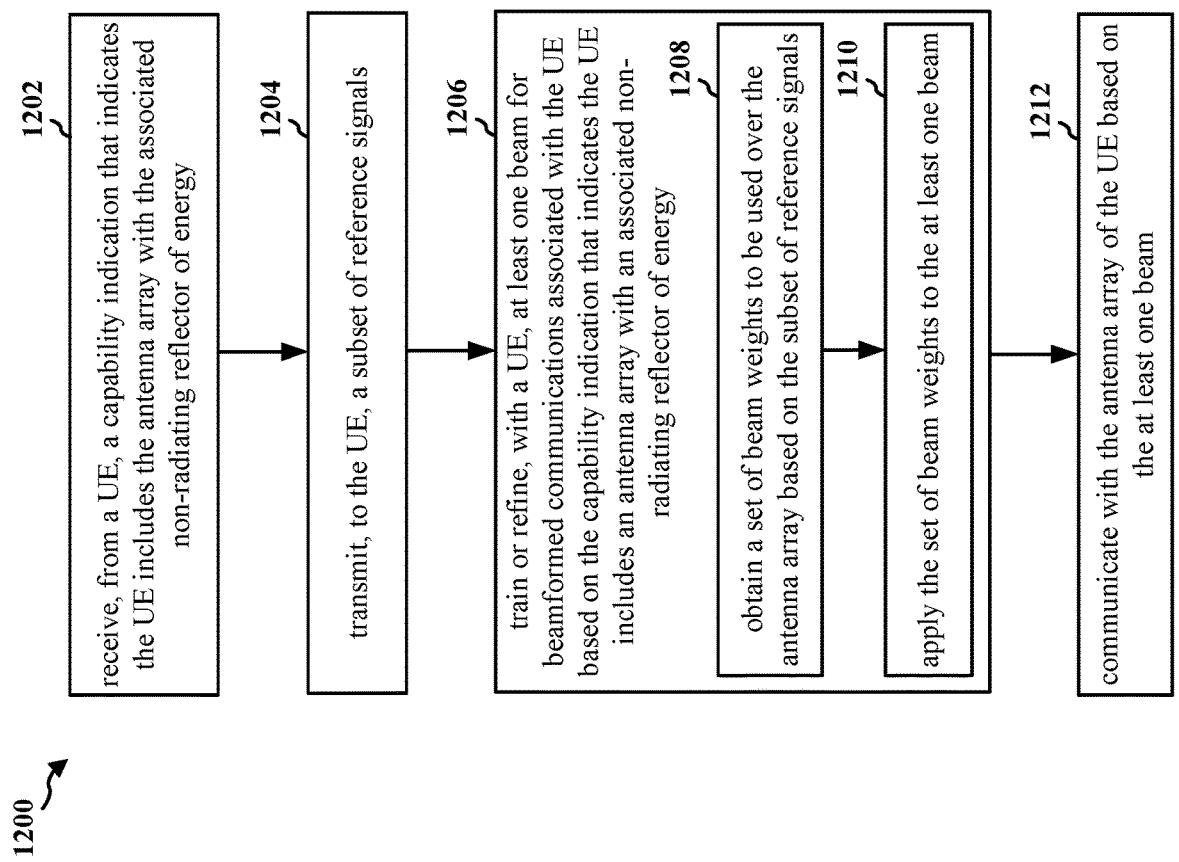
FIG. 12 is a flowchart of a method of wireless communication, in accordance with various aspects of the present disclosure.

FIG. 12 is a flowchart 1200 of a method of wireless communication, in various aspects. The method may be performed by a network node, such as a base station, gNB, etc. (e.g., the base station 102, 604, 804; the network entity 1302, 1402). In some aspects, the method may include aspects described in connection with the communication flow in FIG. 6 and/or aspects described in FIGS. 7, 8. The method may be for UE capability indications of a millimeter wave antenna module enhanced with a reflector and may enable a UE may indicate its capability of an antenna module enhancement for reflecting energy so as to have network node/entity assist the UE in beamforming aspects, where minus such an indication, beam management overhead can be significant to learn the correct beam weights and gainfully utilize the passive reflector of energy.

At 1202, the network node receives, from a UE, a capability indication that indicates the UE includes the antenna array with the associated non-radiating reflector of energy. As an example, the reception may be performed by one or more of the component 199, the transceiver 1446, and/or the antenna 1480 in FIG. 14. FIGS. 6, 7, 8 illustrate an example of a network node (e.g., the base station 604) receiving such a capability indication from a UE (e.g., the UE 602).

The UE 602 may be configured to transmit, to the base station 604 that may be configured to receive, a capability indication 606 (e.g., 808 in FIG. 8) that indicates the UE 602 includes an antenna array with an associated non-radiating reflector of energy (e.g., an antenna module with enhancement 603 (e.g., 704, 706, 708 in FIG. 7; 806 in FIG. 8), as shown). In such aspects, training or refining (e.g., at 610, described below), with a network node (e.g., the base station 604), at least one beam (e.g., 816, 822 in FIG. 8) for beamformed communications associated with the UE 602 may be based on the capability indication 606 (e.g., 808 in FIG. 8). The capability indication 606 (e.g., 808 in FIG. 8) may indicate at least one of an EIRP in a transmit mode or an EIS in a receive mode. In aspects, at least one of the EIRP or the EIS may be associated with a performance realized with an antenna array and its associated non-radiating reflector of energy (e.g., the antenna module with enhancement 603 (e.g., 704, 706, 708 in FIG. 7; 806 in FIG. 8)) of the UE 602. The EIRP and/or the EIS may be indicated as a value, a percentile value, a median, and/or the like, in aspects. The capability indication 606 (e.g., 808 in FIG. 8) may also indicate that the UE 602 includes at least one additional antenna array with an additional associated non-radiating reflector of energy (e.g., the antenna module with enhancement 603 (e.g., 704, 706, 708 in FIG. 7; 806 in FIG. 8)). For example, the capability indication 606 (e.g., 808 in FIG. 8) may indicate a number of antenna arrays with associated non-radiating reflectors of energy (e.g., a number of the antenna module with enhancement 603 (e.g., 704, 706, 708 in FIG. 7; 806 in FIG. 8)) included at the UE 602. In some aspects, the capability indication 606 (e.g., 808 in FIG. 8) may indicate one or more frequency dependent spherical coverage gains associated with the antenna array and the associated non-radiating reflector of energy (e.g., the antenna module with enhancement 603 (e.g., 704, 706, 708 in FIG. 7; 806 in FIG. 8)).

At 1204, the network node transmits, to the UE, a subset of reference signals. As an example, the transmission may be performed by one or more of the component 199, the transceiver 1446, and/or the antenna 1480 in FIG. 14. FIGS. 6, 7, 8 illustrate an example of a network node (e.g., the base station 604) transmitting such a subset of reference signals to a UE (e.g., the UE 602).

The base station 604 may be configured to transmit/provide, and the UE 602 may be configured to receive, the subset of reference signals 608 (e.g., 810 in FIG. 8). As noted above, the base station 604 may be configured to receive the capability indication 606 (e.g., 808 in FIG. 8) and to generate a subset of reference signals 608 (e.g., 810 in FIG. 8). For instance, the base station 604 may be configured to generate the subset of reference signals 608 (e.g., 810 in FIG. 8) from a set of reference signals that are configured/available for the UE 602. The base station 604 may be configured to determine, as the subset of reference signals 608 (e.g., 810 in FIG. 8), a number of reference signals, from a set of configured reference signals, that may be more/most effective for training/refining with the UE 602 based on the capability indication 606 (e.g., 808 in FIG. 8).

As an example, beam weights (e.g., 812, 818 in FIG. 8) for gainfully utilizing the antenna module with enhancement 603 (e.g., 704, 706, 708 in FIG. 7; 806 in FIG. 8) may be very different from beam weights needed for antenna module without enhancement, and thus, appropriate beam training for beams (e.g., 816, 822 in FIG. 8) may be performed, as described herein. That is, beam training without the antenna module with enhancement 603 (e.g., 704, 706, 708 in FIG. 7; 806 in FIG. 8) may be simplified for a given UE, where if N antenna elements form the linear/planar antenna array, K*N directional beams can be sounded out over SSBs where K≥1. On the other hand, for the antenna module with enhancement 603 (e.g., 704, 706, 708 in FIG. 7; 806 in FIG. 8), beam weights (e.g., 812, 818 in FIG. 8) may not be directional, and general training of a beam(s) (e.g., 816, 822 in FIG. 8) over the space of phase shifters and/or amplitude control may be utilized for performance. For example, considering an antenna module with N antenna elements, learning a covariance matrix R from which the general beam weights are learned may not be performed with fewer than $N^2$ reference signals. That is, without the capability indication 606 (e.g., 808 in FIG. 8), beam training for the antenna module with enhancement 603 (e.g., 704, 706, 708 in FIG. 7; 806 in FIG. 8) may lead to significant reference signal, power, and/or thermal overheads, and/or the like, with respect to the UE 602 and the base station 604.

Accordingly, aspects herein provide for the base station 604 to determine the subset of reference signals 608 (e.g., 810 in FIG. 8), from the set of configured reference signals for the UE 602, based on information indicated by the capability indication 606 (e.g., 808 in FIG. 8) in order to reduce the burden for determination of beam weights (e.g., 812, 818 in FIG. 8) by taking the configuration and capability of the UE 602 specifically into account.

At 1206, the network node trains or refines, with a UE, at least one beam for beamformed communications associated with the UE based on a capability indication that indicates the UE includes an antenna array with an associated non-radiating reflector of energy. As an example, the training or refinement may be performed by one or more of the component 199, the transceiver 1446, and/or the antenna 1480 in FIG. 14. FIGS. 6, 7, 8 illustrate an example of a network node (e.g., the base station 604) training or refining such a beam with a UE (e.g., the UE 602).

The base station 604 may be configured to train or refine (at 610), with the UE 602, at least one beam (e.g., 816, 822 in FIG. 8) for beamformed communications 612 associated with the UE 602, where the UE 602 includes the antenna array with an associated non-radiating reflector of energy (e.g., the antenna module with enhancement 603 (e.g., 704, 706, 708 in FIG. 7; 806 in FIG. 8)). To train or refine with the UE 602, in 1006, the base station 604 may be configured to perform one or more additional operations, such in 1008 and/or 1010, described below.

At 1208, the network node obtains a set of beam weights to be used over the antenna array based on the subset of reference signals.

In aspects, the training or refining (at 610) for at least one beam (e.g., 816, 822 in FIG. 8) may be performed with a set of beam weights (e.g., 812, 818 in FIG. 8) used over the antenna array (e.g., the antenna module with enhancement 603 (e.g., 704, 706, 708 in FIG. 7; 806 in FIG. 8)) being defined over a space of phase shifters. In aspects, the training or refining (at 610) for at least one beam (e.g., 816, 822 in FIG. 8) may be performed with a set of beam weights (e.g., 812, 818 in FIG. 8) used over the antenna array (e.g., the antenna module with enhancement 603 (e.g., 704, 706, 708 in FIG. 7; 806 in FIG. 8)) being based on a use of amplitude control across the antenna elements of the antenna array. In aspects, the set of beam weights (e.g., 812, 818 in FIG. 8) may be obtained (e.g., at 610) to be used over the antenna array based on the subset of reference signals 608 (e.g., 810 in FIG. 8), and the set of beam weights (e.g., 812, 818 in FIG. 8) may be applied (e.g., 814, 820 in FIG. 8) to at least one beam (e.g., 816, 822 in FIG. 8). In aspects, the training or refining (at 610) for at least one beam (e.g., 816, 822 in FIG. 8) may be performed between the UE 602 and the base station 604 over a joint P2-P3 session using the subset of reference signals 608 (e.g., 810 in FIG. 8).

At 1210, the network node applies the set of beam weights to the at least one beam.

In aspects, the set of beam weights (e.g., 812, 818 in FIG. 8) may be obtained (e.g., at 610) to be used over the antenna array based on the subset of reference signals 608 (e.g., 810 in FIG. 8), and the set of beam weights (e.g., 812, 818 in FIG. 8) may be applied (e.g., 814, 820 in FIG. 8) to at least one beam (e.g., 816, 822 in FIG. 8). In aspects, the training or refining (at 610) for at least one beam (e.g., 816, 822 in FIG. 8) may be performed between the UE 602 and the base station 604 over a joint P2-P3 session using the subset of reference signals 608 (e.g., 810 in FIG. 8).

At 1212, the network node communicates with the antenna array of the UE based on the at least one beam. As an example, the communication may be performed by one or more of the component 199, the transceiver 1446, and/or the antenna 1480 in FIG. 14. FIGS. 6, 7, 8 illustrate an example of a network node (e.g., the base station 604) communicating with a UE (e.g., the UE 602).

The UE 602 and the base station 604 may be configured to communicate (e.g., receive/transmit communication(s) 612), using the antenna array (e.g., the antenna module with enhancement 603 (e.g., 704, 706, 708 in FIG. 7; 806 in FIG. 8)) and the at least one beam (e.g., 816, 822 in FIG. 8) that was trained/refined (at 610). Accordingly, the UE 602 may utilize a single linear array antenna module with an associated non-radiating reflector of energy (e.g., the antenna module with enhancement 603 (e.g., 704, 706, 708 in FIG. 7; 806 in FIG. 8)) and achieve performance commensurate with multiple array antenna modules.

Figure 13:
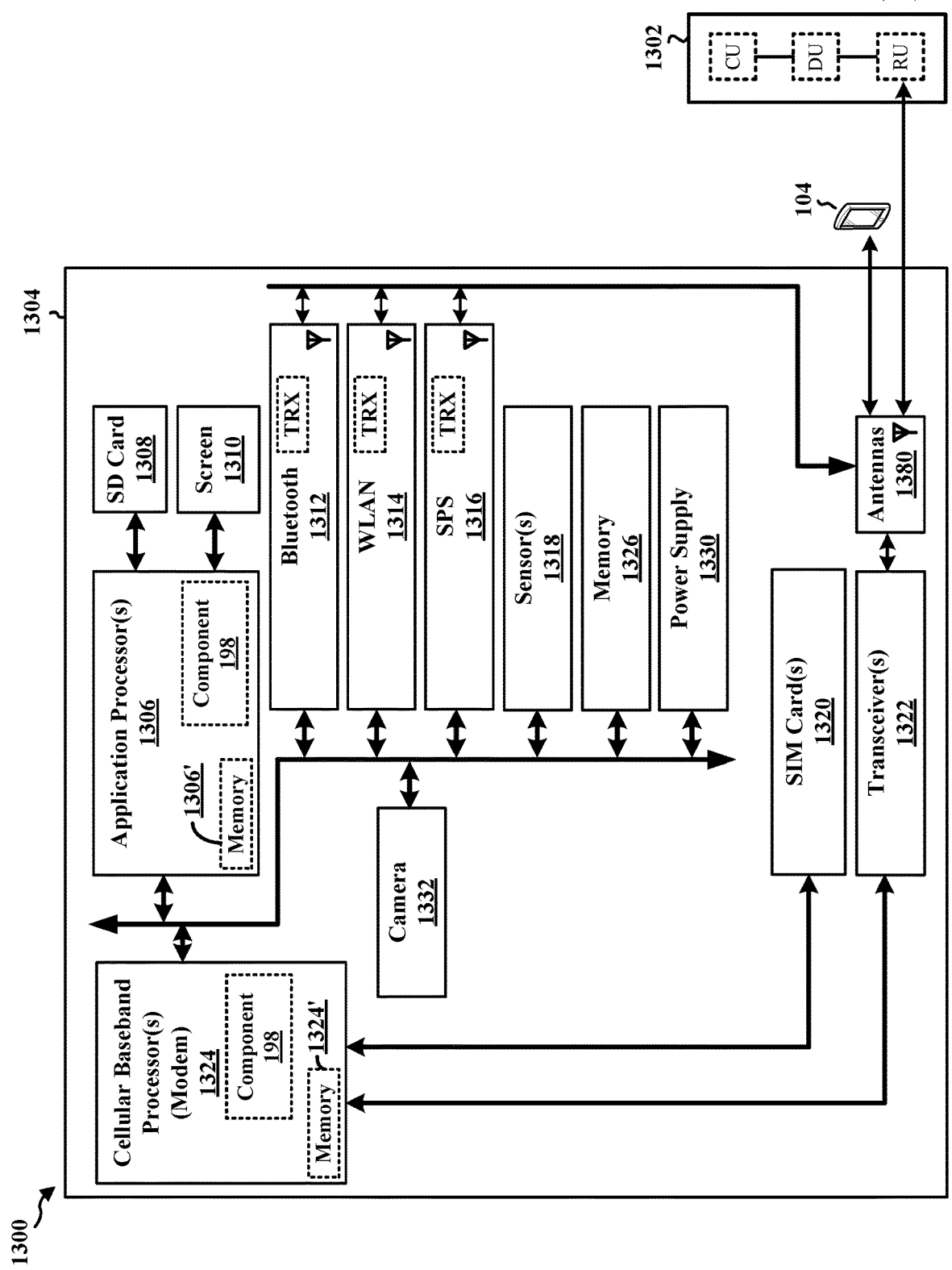
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The cellular baseband processor(s) 1324 and the application processor(s) 1306 are configured to perform the various functions described supra based at least in part of the information stored in the memory. That is, the cellular baseband processor(s) 1324 and the application processor(s) 1306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the component 198 may be configured to train or refine, with a network node, at least one beam for beamformed communications associated with the UE, where the UE includes an antenna array with an associated non-radiating reflector of energy. The component 198 may also be configured to communicate, with the network node, using the antenna array and the at least one beam. The component 198 may also be configured to transmit, to the network node, a capability indication that indicates the UE includes the antenna array with the associated non-radiating reflector of energy. The component 198 may also be configured to receive, from the network node, a subset of reference signals, where the subset of reference signals is based on the capability indication. The component 198 may be further configured to perform any of the aspects described in connection with the flowcharts in any of FIGS. 9, 10, 11, 12, and/or any of the aspects performed by a UE for any of FIGS. 6, 7, 8. The component 198 may be within the cellular baseband processor(s) 1324, the application processor(s) 1306, or both the cellular baseband processor(s) 1324 and the application processor(s) 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor (s) 1306, may include means for training or refining, with a network node, at least one beam for beamformed communications associated with the UE, where the UE includes an antenna array with an associated non-radiating reflector of energy. In the configuration, the apparatus 1304, and in particular the cellular baseband processor(s) 1324 and/or the application processor(s) 1306, may include means for communicating, with the network node, using the antenna array and the at least one beam. In one configuration, the apparatus 1304, and in particular the cellular baseband processor(s) 1324 and/or the application processor(s) 1306, may include means for transmitting, to the network node, a capability indication that indicates the UE includes the antenna array with the associated non-radiating reflector of energy. In one configuration, the apparatus 1304, and in particular the cellular baseband processor(s) 1324 and/or the application processor(s) 1306, may include means for receiving, from the network node, a subset of reference signals, where the subset of reference signals is based on the capability indication. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
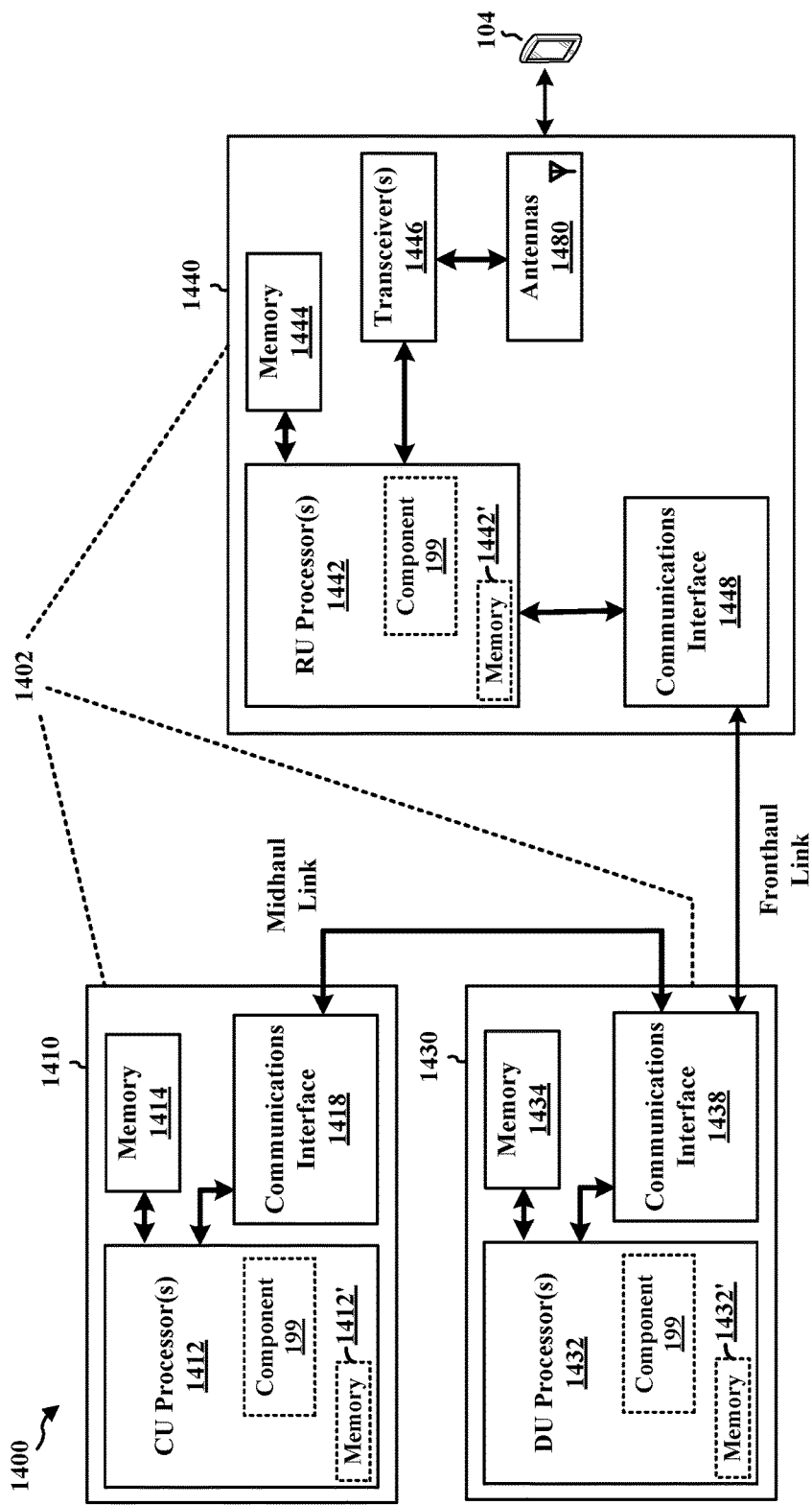
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor 1412. The CU processor(s) 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor 1432. The DU processor(s) 1432 may include on-chip memory 1432'. In some aspects, the DU 1430 may further include additional memory modules 1434 and a communications interface 1438. The DU 1430 communicates with the RU 1440 through a fronthaul link. The RU 1440 may include at least one RU processor 1442. The RU processor(s) 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/ memory may also be used for storing data that is manipulated by the processor(s) when executing software.

As discussed supra, the component 199 may be configured to train or refine, with a UE, at least one beam for beamformed communications associated with the UE based on a capability indication that indicates the UE includes an antenna array with an associated non-radiating reflector of energy. The component 199 may also be configured to communicate with the antenna array of the UE based on the at least one beam. The component 199 may be configured to receive, from the UE, the capability indication that indicates the UE includes the antenna array with the associated non-radiating reflector of energy. The component 199 may be configured to transmit, to the UE, a subset of reference signals, where the subset of reference signals is based on the capability indication. The component 199 may be further configured to perform any of the aspects described in connection with the flowcharts in any of FIGS. 9, 10, 11, 12, and/or any of the aspects performed by a network node/entity for any of FIGS. 6, 7, 8. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 may include means for training or refining, with a UE, at least one beam for beamformed communications associated with the UE based on a capability indication that indicates the UE includes an antenna array with an associated non-radiating reflector of energy. In the configuration, the network entity 1402 may include means for communicating with the antenna array of the UE based on the at least one beam. In one configuration, the network entity 1402 may include means for receiving, from the UE, the capability indication that indicates the UE includes the antenna array with the associated non-radiating reflector of energy. In one configuration, the network entity 1402 may include means for transmitting, to the UE, a subset of reference signals, where the subset of reference signals is based on the capability indication. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Wireless communication networks may transmit or receive signals with devices using various antenna configurations. As an example, a UE may support various antenna configurations to receive beamformed wireless communication. In some configurations, multiple antennas may be used at a network device (e.g., a base station, a gNB, etc.) and at a UE to exchange wireless communication in a millimeter wave system. Beamforming from multiple antennas may provide a bridge to the link budget in these systems. For instance, multiple antenna modules/panels (e.g., with each antenna module) having a set of antenna elements that can be co-phased in beamforming may be used in such systems. The use of multiple antenna modules may afford the ability to meet spherical coverage desired with and without hand/body blockage of devices, as well as robustness with beam switching over these antenna modules. Some UEs may support the use of two or three antenna modules on two or three edges thereof, where each antenna module may be made up of a 4×1 or a 5×1 dual-polarized antenna array. In some implementations, two antenna modules on the long edges of a UE may be used to reduce cost. However, as millimeter wave systems evolve, some wireless devices may utilize a single antenna module solution to reduce costs. Thus, a single antenna module can be designed for which radio-frequency integrated circuit (RFIC) antenna feed constraints are managed in different ways. One such possibility is an L-shaped antenna module, the geometry of which may allow multiple bounces of radiation from the antenna elements via the hand/fingers of a user into different parts of the sphere of coverage.

Various aspects herein for UE capability indications of a millimeter wave antenna module enhanced with a reflector provide for a passive or non-radiating reflector enhancement has a geometry that allows multiple bounces of radiation from antenna elements via the hand/fingers of a user into different parts of the coverage sphere that provides for spherical coverage improvements over the sphere. In aspects, the passive reflectors may guide signals to different parts of the sphere and may be metallic-based, glass-based, and/or the like. In aspects, a UE may indicate its capability of such an antenna module enhancement for reflecting energy so as to have network node/entity assist the UE in beamforming aspects, where minus such an indication, beam management overhead can be significant to learn the correct beam weights and gainfully utilize the passive reflector of energy. The described aspects provide the ability to meet spherical coverage desired with and without hand/body blockage of devices by utilizing an antenna array with an associated non-radiating reflector of energy. The described aspects reduce cost and complexity of implementation for UEs over multi-sided antenna module by utilizing an antenna array with an associated non-radiating reflector of energy. The described aspects can also be used to train/refine beams for beamformed communications with a network node more efficiently with respect to beam management overhead, processing utilization, and power consumption by providing a capability of antenna module enhancement for reflecting energy.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C. B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: training or refining, with a network node, at least one beam for beamformed communications associated with the UE, wherein the UE includes an antenna array with an associated non-radiating reflector of energy; and communicating, with the network node, using the antenna array and the at least one beam.

Aspect 2 is the method of aspect 1, further comprising: transmitting, to the network node, a capability indication that indicates the UE includes the antenna array with the associated non-radiating reflector of energy; wherein training or refining, with the network node, the at least one beam for beamformed communications associated with the UE is based on the capability indication.

Aspect 3 is the method of aspect 2, wherein the capability indication indicates at least one of an effective isotropic radiated power (EIRP) in a transmit mode or an effective isotropic sensitivity (EIS) in a receive mode.

Aspect 4 is the method of aspect 3, wherein a performance realized with at least one of the EIRP or the EIS is associated with the antenna array and the associated non-radiating reflector of energy.

Aspect 5 is the method of any of aspects 3 and 4, wherein at least one of the EIRP or the EIS is indicated as a percentile value.

Aspect 6 is the method of any of aspects 2 to 5, wherein the capability indication indicates that the UE includes at least one additional antenna array with an additional associated non-radiating reflector of energy.

Aspect 7 is the method of any of aspects 2 to 6, wherein the capability indication indicates one or more frequency dependent spherical coverage gains associated with the antenna array and the associated non-radiating reflector of energy.

Aspect 8 is the method of any of aspects 2 to 7, wherein training or refining the at least one beam includes at least one of: training or refining the at least one beam with a set of beam weights used over the antenna array being defined over a space of phase shifters; or training or refining the at least one beam with the set of beam weights used over the antenna array being based on a use of amplitude control across antenna elements of the antenna array.

Aspect 9 is the method of aspect 8, wherein training or refining the at least one beam is based on a subset of reference signals from a set of configured reference signals, wherein the subset of reference signals is based on the capability indication.

Aspect 10 is the method of aspect 9, further comprising: receiving, from the network node, the subset of reference signals; wherein training or refining the at least one beam includes: obtaining the set of beam weights to be used over the antenna array based on the subset of reference signals; and applying the set of beam weights to the at least one beam.

Aspect 11 is method of wireless communication at a network node, comprising: training or refining, with a user equipment (UE), at least one beam for beamformed communications associated with the UE based on a capability indication that indicates the UE includes an antenna array with an associated non-radiating reflector of energy; and communicating with the antenna array of the UE based on the at least one beam.

Aspect 12 is the method of aspect 11, further comprising: receiving, from the UE, the capability indication that indicates the UE includes the antenna array with the associated non-radiating reflector of energy; wherein training or refining, with the UE, the at least one beam for beamformed communications associated with the UE is based on the capability indication.

Aspect 13 is the method of aspect 12, wherein the capability indication indicates at least one of an effective isotropic radiated power (EIRP) in a transmit mode or an effective isotropic sensitivity (EIS) in a receive mode.

Aspect 14 is the method of aspect 13, wherein a performance realized with at least one of the EIRP or the EIS is associated with the antenna array and the associated non-radiating reflector of energy.

Aspect 15 is the method of any of aspects 13 and 14, wherein at least one of the EIRP or the EIS is indicated as a percentile value.

Aspect 16 is the method of any of aspects 12 to 15, wherein the capability indication indicates that the UE includes at least one additional antenna array with an additional associated non-radiating reflector of energy.

Aspect 17 is the method of any of aspects 12 to 16, wherein the capability indication indicates one or more frequency dependent spherical coverage gains associated with the antenna array and the associated non-radiating reflector of energy.

Aspect 18 is the method of any of aspects 12 to 17, wherein training or refining the at least one beam includes at least one of: training or refining the at least one beam with a set of beam weights used over the antenna array defined over a space of phase shifters; or training or refining the at least one beam with the set of beam weights used over the antenna array being based on a use of amplitude control across antenna elements of the antenna array.

Aspect 19 is the method of aspect 18, wherein training or refining the at least one beam is based on a subset of reference signals from a set of configured reference signals, wherein the subset of reference signals is based on the capability indication.

Aspect 20 is the method of aspect 19, further comprising: transmitting, to the UE, the subset of reference signals; wherein training or refining the at least one beam includes: obtaining the set of beam weights based on the subset of reference signals; and applying the set of beam weights to the at least one beam.

Aspect 21 is an apparatus for wireless communication including means for implementing any of aspects 1 to 10.

Aspect 22 is a computer-readable medium (e.g., a non-transitory computer-readable medium) storing computer executable code, the code when executed by at least one processor causes the at least one processor to implement any of aspects 1 to 10.

Aspect 23 is an apparatus for wireless communication at a network node. The apparatus includes a memory; and at least one processor coupled to the memory and, based at least in part on information stored in the memory, the at least one processor is configured to implement any of aspects 1 to 10.

Aspect 24 is the apparatus of aspect 23, further including at least one of a transceiver or an antenna coupled to the at least one processor.

Aspect 25 is an apparatus for wireless communication including means for implementing any of aspects 11 to 20.

Aspect 26 is a computer-readable medium (e.g., a non-transitory computer-readable medium) storing computer executable code, the code when executed by at least one processor causes the at least one processor to implement any of aspects 11 to 20.

Aspect 27 is an apparatus for wireless communication at a network node. The apparatus includes a memory; and at least one processor coupled to the memory and, based at least in part on information stored in the memory, the at least one processor is configured to implement any of aspects 11 to 20.

Aspect 28 is the apparatus of aspect 27, further including at least one of a transceiver or an antenna coupled to the at least one processor.

Aspect 29 is an apparatus for wireless communication at a user equipment (UE), comprising: at least one memory; and at least one processor coupled to the at least one memory and, based at least in part on information stored in the at least one memory, the at least one processor, individually or in any combination, is configured to perform the method of any of aspects 1 to 10.

Aspect 30 is an apparatus for wireless communication at a user equipment (UE), comprising means for performing each step in the method of any of aspects 1 to 10.

Aspect 31 is the apparatus of any of aspects 19 and 30, further comprising a transceiver configured to receive or to transmit in association with the method of any of aspects 1 to 10.

Aspect 32 is a computer-readable medium (e.g., a non-transitory computer-readable medium) storing computer executable code at a user equipment (UE), the code when executed by at least one processor causes the at least one processor to perform the method of any of aspects 1 to 10.

Aspect 33 is an apparatus for wireless communication at a network node, comprising: at least one memory; and at least one processor coupled to the at least one memory and, based at least in part on information stored in the at least one memory, the at least one processor, individually or in any combination, is configured to perform the method of any of aspects 11 to 20.

Aspect 34 is an apparatus for wireless communication at a network node, comprising means for performing each step in the method of any of aspects 11 to 20.

Aspect 35 is the apparatus of any of aspects 33 and 34, further comprising a transceiver configured to receive or to transmit in association with the method of any of aspects 11 to 20.

Aspect 36 is a computer-readable medium (e.g., a non-transitory computer-readable medium) storing computer executable code at a network node, the code when executed by at least one processor causes the at least one processor to perform the method of any of aspects 11 to 20.

What is claimed is:

1. An apparatus for wireless communication at a user equipment (UE), comprising:
   at least one memory;
   an antenna array;
   a non-radiating reflector of energy associated with the antenna array; and
   at least one processor coupled to the at least one memory and, based at least in part on information stored in the at least one memory, the at least one processor, individually or in any combination, is configured to:
   train or refine, with a network node, at least one beam for beamformed communications associated with the UE; and
   communicate, with the network node, using the antenna array and the at least one beam.

2. The apparatus of claim 1, wherein the at least one processor, individually or in any combination, is further configured to:
   transmit, to the network node, a capability indication that indicates the UE includes the antenna array with the associated non-radiating reflector of energy;
   wherein to train or refine, with the network node, the at least one beam for beamformed communications associated with the UE, the at least one processor, individually or in any combination, is configured to train or refine, with the network node, the at least one beam based on the capability indication.

3. The apparatus of claim 2, wherein the capability indication indicates at least one of an effective isotropic radiated power (EIRP) in a transmit mode or an effective isotropic sensitivity (EIS) in a receive mode.

4. The apparatus of claim 3, wherein a performance realized with at least one of the EIRP or the EIS is associated with the antenna array and the associated non-radiating reflector of energy.

5. The apparatus of claim 3, wherein at least one of the EIRP or the EIS is indicated as a percentile value.

6. The apparatus of claim 2, further comprising:
at least one additional antenna array; and
an additional non-radiating reflector of energy associated with the at least one additional antenna array,
wherein the capability indication indicates that the UE includes the at least one additional antenna array with the additional associated non-radiating reflector of energy.

7. The apparatus of claim 2, wherein the capability indication indicates one or more frequency dependent spherical coverage gains associated with the antenna array and the associated non-radiating reflector of energy.

8. The apparatus of claim 2, wherein to train or refine the at least one beam, the at least one processor, individually or in any combination, is configured to train or refine the at least one beam with at least one of:
a set of beam weights used over the antenna array being defined over a space of phase shifters; or
the set of beam weights used over the antenna array being based on a use of amplitude control across antenna elements of the antenna array.

9. The apparatus of claim 8, wherein to train or refine the at least one beam, the at least one processor, individually or in any combination, is configured to train or refine the at least one beam based on a subset of reference signals from a set of configured reference signals, wherein the subset of reference signals is based on the capability indication.

10. The apparatus of claim 9, the at least one processor, individually or in any combination, is further configured to:
receive, from the network node, the subset of reference signals;
wherein to train or refine the at least one beam, the at least one processor, individually or in any combination, is configured to:
obtain the set of beam weights to be used over the antenna array based on the subset of reference signals; and
apply the set of beam weights to the at least one beam.

11. The apparatus of claim 2, further comprising a transceiver coupled to the at least one processor, wherein to transmit, to the network node, the capability indication that indicates the UE includes the antenna array with the associated non-radiating reflector of energy, the at least one processor, individually or in any combination, is configured to: transmit, via the transceiver to the network node, the capability indication that indicates the UE includes the antenna array with the associated non-radiating reflector of energy.

12. An apparatus for wireless communication at a network node, comprising:
at least one memory; and
at least one processor coupled to the at least one memory and, based at least in part on information stored in the at least one memory, the at least one processor, individually or in any combination, is configured to:
train or refine, with a user equipment (UE), at least one beam for beamformed communications associated with the UE based on a capability indication that indicates the UE includes an antenna array with an associated non-radiating reflector of energy; and
communicate with the antenna array of the UE based on the at least one beam.

13. The apparatus of claim 12, wherein the at least one processor, individually or in any combination, is further configured to:
receive, from the UE, the capability indication that indicates the UE includes the antenna array with the associated non-radiating reflector of energy;
wherein to train or refine, with the UE, the at least one beam for beamformed communications associated with the UE, the at least one processor, individually or in any combination, is configured to train or refine, with the UE, the at least one beam based on the capability indication.

14. The apparatus of claim 13, wherein the capability indication indicates at least one of an effective isotropic radiated power (EIRP) in a transmit mode or an effective isotropic sensitivity (EIS) in a receive mode.

15. The apparatus of claim 14, wherein a performance realized with at least one of the EIRP or the EIS is associated with the antenna array and the associated non-radiating reflector of energy.

16. The apparatus of claim 14, wherein at least one of the EIRP or the EIS is indicated as a percentile value.

17. The apparatus of claim 13, wherein the capability indication indicates that the UE includes at least one additional antenna array with an additional associated non-radiating reflector of energy.

18. The apparatus of claim 13, wherein the capability indication indicates one or more frequency dependent spherical coverage gains associated with the antenna array and the associated non-radiating reflector of energy.

19. The apparatus of claim 13, wherein to train or refine the at least one beam, the at least one beam for beamformed communications associated with the UE, the at least one processor, individually or in any combination, is configured to train or refine the at least one beam with at least one of:
a set of beam weights used over the antenna array defined over a space of phase shifters; or
the set of beam weights used over the antenna array being based on a use of amplitude control across antenna elements of the antenna array.

20. The apparatus of claim 19, wherein to train or refine the at least one beam, the at least one beam for beamformed communications associated with the UE, the at least one processor, individually or in any combination, is configured to train or refine the at least one beam based on a subset of reference signals from a set of configured reference signals, wherein the subset of reference signals is based on the capability indication.

21. The apparatus of claim 20, wherein the at least one processor, individually or in any combination, is further configured to:
transmit, to the UE, the subset of reference signals;
wherein to train or refine the at least one beam, the at least one processor, individually or in any combination, is configured to:
obtain the set of beam weights based on the subset of reference signals; and
apply the set of beam weights to the at least one beam.

22. The apparatus of claim 13, further comprising a transceiver coupled to the at least one processor, wherein to receive, from the UE, the capability indication that indicates the UE includes the antenna array with the associated non-radiating reflector of energy, the at least one processor, individually or in any combination, is configured to: receive, via the transceiver from the UE, the capability indication that indicates the UE includes the antenna array with the associated non-radiating reflector of energy.

23. A method of wireless communication at a user equipment (UE), comprising:
training or refining, with a network node, at least one beam for beamformed communications associated with the UE, wherein the UE includes an antenna array with an associated non-radiating reflector of energy; and
communicating, with the network node, using the antenna array and the at least one beam.

24. The method of claim 23, further comprising:
transmitting, to the network node, a capability indication that indicates the UE includes the antenna array with the associated non-radiating reflector of energy;
wherein training or refining, with the network node, the at least one beam for beamformed communications associated with the UE is based on the capability indication.

25. The method of claim 24, wherein the capability indication indicates at least one of an effective isotropic radiated power (EIRP) in a transmit mode or an effective isotropic sensitivity (EIS) in a receive mode associated with a performance realized with the antenna array and the associated non-radiating reflector of energy.

26. The method of claim 24, wherein the capability indication indicates that the UE includes at least one additional antenna array with an additional associated non-radiating reflector of energy; or
wherein the capability indication indicates one or more frequency dependent spherical coverage gains associated with the antenna array and the associated non-radiating reflector of energy.

27. A method of wireless communication at a network node, comprising:
training or refining, with a user equipment (UE), at least one beam for beamformed communications associated with the UE based on a capability indication that indicates the UE includes an antenna array with an associated non-radiating reflector of energy; and
communicating with the antenna array of the UE based on the at least one beam.

28. The method of claim 27, further comprising:
receiving, from the UE, the capability indication that indicates the UE includes the antenna array with the associated non-radiating reflector of energy;
wherein training or refining, with the UE, the at least one beam for beamformed communications associated with the UE is based on the capability indication.

29. The method of claim 28, wherein the capability indication indicates at least one of an effective isotropic radiated power (EIRP) in a transmit mode or an effective isotropic sensitivity (EIS) in a receive mode associated with a performance realized with the antenna array and the associated non-radiating reflector of energy.

30. The method of claim 28, wherein the capability indication indicates that the UE includes at least one additional antenna array with an additional associated non-radiating reflector of energy; or
wherein the capability indication indicates one or more frequency dependent spherical coverage gains associated with the antenna array and the associated non-radiating reflector of energy.

* * * * *